(12) United States Patent
Takegoshi et al.

(10) Patent No.: US 7,824,750 B2
(45) Date of Patent: Nov. 2, 2010

(54) INSIDE-COATED METAL CONTAINER AND ITS MANUFACTURING METHOD

(75) Inventors: Minoru Takegoshi, Toyama (JP); Hideki Taguchi, Toyama (JP); Syoichiro Akane, Toyama (JP)

(73) Assignee: Takeuchi Press Industries Co., Ltd., Toyama (JP)

( * ) Notice: Subject to any disclaimer, the term of this patent is extended or adjusted under 35 U.S.C. 154(b) by 135 days.

(21) Appl. No.: 10/489,672

(22) PCT Filed: Sep. 17, 2002

(86) PCT No.: PCT/JP02/09537

§ 371 (c)(1),
(2), (4) Date: Mar. 16, 2004

(87) PCT Pub. No.: WO03/024812

PCT Pub. Date: Mar. 27, 2003

(65) Prior Publication Data

US 2004/0241363 A1    Dec. 2, 2004

(30) Foreign Application Priority Data

Sep. 17, 2001    (JP) .............................. 2001-282294

(51) Int. Cl.
*B32B 1/02*    (2006.01)
*B32B 27/00*    (2006.01)
*B32B 1/08*    (2006.01)

(52) U.S. Cl. ..................... 428/35.7; 428/34.1; 428/34.2; 428/35.9; 428/36.9

(58) Field of Classification Search ................ 428/34.1, 428/34.2, 35.7, 35.9, 36.9
See application file for complete search history.

(56) References Cited

U.S. PATENT DOCUMENTS 3,365,111 A * 1/1968 Columbo et al. ............. 229/249
3,615,366 A * 10/1971 Allen .......................... 420/42

(Continued)

FOREIGN PATENT DOCUMENTS

JP    61-047344 A1    3/1986

(Continued)

OTHER PUBLICATIONS

International Search Report for PCT/JP02/09537 mailed on Nov. 19, 2002.

*Primary Examiner*—Marc A Patterson
(74) *Attorney, Agent, or Firm*—Cheng Law Group, PLLC

(57) ABSTRACT

The durability of the inside coating to the deformation processing in the post-processing of the inside-coated metal container having corrosion-resistivity is improved to reduce minor cracks and peelings as far as possible. In an inside-coated metal container 10 in which a high-degree of deformation processing is applied to the vicinity of an opening of one end after coating the inner surface, the coating films formed by the coating have the first layer 12 with high deformation processing durability laid on an area where the high-degree deformation processing is applied and the second layer 13 with high corrosion resistivity laid on the entire inner surface including the first layer of the metal container. The first layer 12 is made of phenolic epoxy resin coatings containing little phenol component and no pigment, and the second layer 13 is made of phenolic epoxy resin coatings containing much phenolic component and pigment.

9 Claims, 15 Drawing Sheets

U.S. PATENT DOCUMENTS

| | | | | |
|---|---|---|---|---|
| 4,645,087 A | * | 2/1987 | Kusz | 215/254 |
| 4,912,179 A | * | 3/1990 | Murakami et al. | 525/524 |
| 5,419,935 A | * | 5/1995 | Butera | 428/35.6 |
| 5,990,199 A | * | 11/1999 | Bealing et al. | 523/161 |
| 6,010,028 A | * | 1/2000 | Jordan et al. | 220/669 |
| 6,036,042 A | | 3/2000 | Pietruch et al. | 220/62.12 |
| 6,106,900 A | * | 8/2000 | Innes et al. | 427/358 |
| 6,214,416 B1 | * | 4/2001 | Sakagami et al. | 427/387 |
| 6,235,358 B1 | * | 5/2001 | Goto et al. | 428/35.7 |

FOREIGN PATENT DOCUMENTS

| | | |
|---|---|---|
| JP | 01-214433 A1 | 8/1989 |
| JP | 02-303634 A1 | 12/1990 |
| JP | 03-072578 A1 | 3/1991 |
| JP | 07-021538 U1 | 4/1995 |
| JP | 07-145345 A1 | 6/1995 |
| JP | 07-205370 A1 | 8/1995 |
| JP | 09-143396 A1 | 6/1997 |
| JP | 09-271374 A1 | 10/1997 |
| JP | 2001-205738 A1 | 7/2001 |
| JP | 2001-213416 A1 | 8/2001 |

* cited by examiner

A METAL CONTAINER AND ITS MANUFACTURING METHOD

INSIDE-COATED METAL CONTAINER AND ITS MANUFACTURING METHOD

FIELD OF THE INVENTION

This invention relates to an inside-coated metal container. Further relates to a coating film of a metal can processed by necking or threading at the vicinity of the opening after coating its inner surface, or a collapsible metal tube processed by clinching its bottom part after coating its inner surface and charging contents.

BACKGROUND ARTS

Conventionally, a synthetic resin coating with high corrosion resistance is applied on an inner surface of a metal container for protecting the inner surface of the metal container from its contents. As an example of such a metal container with an inside coating film, a metal can 100 with an inside coating film shown in FIG. 15 is known. This metal can 100 comprises a can 101 and a coating film 102 provided on the inner surface. The can 101 is plastic-deformed body of an aluminum sheet by stamping comprising a cylindrical body (side wall) 103, a bottom 104 closing the lower end, a truncated cone like shoulder 105 continuing from the upper part of the cylindrical body, and a cylindrical neck part 106 extending upward from the shoulder. A carting (a bead) 107 winding outside is provided at a top of the neck part 106. A thread 106a is formed around the neck part.

The manufacturing method of the metal can 100 is, in the case of a drawing-ironing can, a blank material produced by circularly punching out a thin metal sheet is processed by deep drawing to form a bottomed cylinder; and the bottomed cylinder is processed by ironing to make its body thin. Further the inner surface of the obtained bottomed cylindrical can is coated with the coating film 102 by powder coating or spray coating. After the coating film is formed, the shoulder 105 and the neck part 106 are formed by the necking processing. And then, the curling 107 is formed by the curling processing. In the case of a drawing-ironing can having a thread part, the shoulder and the thread part are formed by the spinning processing.

In the case of an impact can having a thread part used for an aerosol container, a thick metal sheet is punched out circularly, its shape is case by case arranged to form a slug, and an impact processing is applied to form a bottomed cylinder. And then, an inner surface is coated, the shoulder and the neck are formed by necking processing, and a bead part is formed by the curling processing. These processes are same as those of drawing-ironing can.

As described above, the inside coating films are formed after the plastic forming process of the metal sheets and slugs into the shape of a bottomed cylinder. Further after the coating, the shoulder and the neck part are formed by the necking processing (post processing). The reason why the inside coating film is formed before the post processing is because, when the inner surface is coated after the post processing, it may cause surface irregularity or partial lack of coatings resulting in unsatisfactory corrosion-resistance performance of the inside coating films, of which purpose is to protect the metal container from corrosion due to the contents.

As for the inside coating films 102, various coating films materials may be used depending on the property and purpose of the contents. For example, in the case that coating films having corrosion-resistibility of the metal, and excellent workability/adhesiveness to the can body is desired, phenolic epoxy resin may be coated. In this case, it is proposed that the drawing processing is provided to a pre-coated material in which the bottom of the can is coated with oil-based resin type coating film containing zinc oxide powder, and that the body is separately coated with phenolic epoxy resin type coating films (Refer to Japanese Unexamined Patent Publication No. 1986-47344). This invention is intended for prevention of inside sulfide foxing of the metal container due to marine products. In the Japanese Unexamined Patent Publication No. 1993-138125, a powder coating process is disclosed, in which the bottom and the can body are separately coated and baked at one time. And further, in this process, the same coating material can be coated separately and baked at one time.

In the Japanese Patent No. 2562343, a two layers inside coating technology for an aerosol product made of steel filled with a water-based aerosol composition is disclosed, wherein the priming layer is composed of 1 to 8 µm thick phenolic epoxy resin type coating compounds and the over coating layer is composed of 3 to 20 µm thick vinyl organosol resin type coating compounds whose glass transition temperature is higher than 50° C. These technologies are said to be able to prevent occurrence of cracks in the necking processing or in the double seam processing of the bottom and body. Further, the inside-coated can having primary layer with thickness of 1 µm or less composed of water based phenolic epoxy resin type coating compound and surface layer with thickness of 2 to 20 µm composed of water based/water dispersible phenolic epoxy acrylic resin type coating compound is disclosed in Japanese Unexamined Patent Publication H03-72578.

Further, the other inside-coated metal can manufacturing technologies are known, wherein a pre-coated material having two layers of coating film is processed by ironing (DRD processing, DI processing). For example, a food container for foods containing sulfur (Japanese Unexamined Patent Publication No. 1981-32237) is known, wherein phenolic epoxy resin type coating compound containing Al pigment is coated as the priming layer and the surface of the priming layer is covered with polyolefin films containing zinc oxide powder or unsaturated polyester films. And further, a metal can restraining the absorption of the pigment contained in foods such as crabs is known (Japanese Unexamined Patent Publication No. 1990-242743), wherein vinyl organosol resin type coating compound is coated as the priming layer and phenolic epoxy resin type coating compound is coated as the surface layer; and baked two times.

In the two times coating, a technology to prevent drooping of crude hardened coating films or occurrence of pinholes/cracks is known, wherein preparative drying or interim drying is carried out between the first and the second coating (Japanese Patent Publication No. 1988-44026, Japanese Patent Publication No. 1989-43584, Japanese Unexamined Patent Publication No. 2000-104013 etc.)

On the other hand, technology using UV ink is known and used for coated plywood boards and the likes (Japanese Unexamined Patent Publication No. 1973-60175. Japanese Unexamined Patent No. 1986-290099). However, since the UV ink contains photo polymerization initiator and photosensitizer, it is not suitable for inside coating of food containers or containers due to unknown safety to human body and due to stability problems in storage. In the Japanese Unexamined Patent Publication No. 1997-173898, a metal food container is disclosed, in which an ultraviolet ray-hardened type resin is printed on the outer surface of the container; a polymeric monomer not containing photo polymerization initiator and photosensitizer is over coated; and ultraviolet rays are illuminated to harden the coating, thus avoiding the photo polymerization initiator and photosensitizer to be contained on the outer surface of the container. However, the UV ink is not used for the inside coating of containers.

In collapsible tubes of metal type, a manufacturing technology is disclosed, in which forming the priming layer on the inner surface of the tube with epoxy resin type coating compound, and forming the covering layer on the priming layer by powder coating, so as to form thin film in the part of clinching (the coating film as the priming layer is allowed to expose) (Japanese Unexamined Utility Model Publication No. 1984-16850). This is directed to save the powder coating compound and to improve the visual appearance. Further, in order to improve the sealing performance of the clinching part, a tube container coated by powder coating is known, in which the clinching part of the inner tube is left uncoated (Japanese Unexamined Patent Publication No. 1980-116558).

The conventional metal containers, to which the corrosion-resistive inside coating is applied after the forming of cylindrical shape and then severe deformation processing or plastic processing such as necking, curling, or threading is applied, may cause the occurrence of crack or peelings of the inside coating films in the thread part or the necking part. Even in the case that no crack or peelings is found by visual check, the bad result of the electric flow test (high current flow in the current flow test) may be obtained due to the microscopic cracks or pinholes.

This invention is directed to the improvement of processing resistibility of corrosion-resistant inside-coated metal containers in the post processing, in which to reduce microscopic cracks and peelings as far as possible, and to obtain better electric current flow test results. Further, this invention is directed to provide a manufacturing method of metal containers having good durability to the post processing and having high corrosion resistivity to its contents.

DISCLOSURE OF INVENTION

An inside-coated metal container, in which a high-degree of the deformation processing is applied to the vicinity of the opening of one end after coating the inner surface; comprises the coating film formed by the coating having the first layer with high durability to deformation processing laid at least on an area where the high-degree deformation processing is applied and second layer with high corrosion resistance laid at least on an area where the low-degree deformation processing is applied; and the entire inner surface of the container is covered with the first and/or the second layer. Here, "an area where the high-degree deformation processing is applied" and "an area where the low-degree deformation processing is applied" means deformation processing or plastic processing applied after the coating of the inner surface and does not mean any of the processing prior to the coating of the inner surface. In other words, in the case that no high-degree deformation processing is applied to an area after the coating of the inner surface, it is defined as an area where the low-degree deformation processing is applied, even if it is an area to which the high-degree deformation processing is applied before the coating of the inner surface. "The area where the low-degree deformation processing is applied" includes the area without any plastic processing.

The metal container is preferable to be a mono-block container processed by the impact processing, the deep drawing, or the drawing-ironing. Further, the mouth of the container is preferable to be threaded.

Further, the third layer composed of Ultra Violet ink or hot metal agent is preferable to be laid on the whole or a part of the inner surface of the container.

In such metal containers, it is preferable that the first layer is laid entirely on the inner surface and the second layer is laid on the area of the first layer where the low-degree deformation processing is applied or laid entirely on the first layer. And, the first layer can be laid on the area where the high-degree deformation processing is applied and the second layer can be laid entirely on the inner surface including the area of the first layer. In this case, the third layer of the same material as that of the first layer is further laid on the area of the second layer where the first layer corresponds. And further, the first layer can be laid on the area where high-degree of the deformation processing is applied, and the second layer can be laid on the area where the low-degree of deformation processing is applied overlapping the first layer at the vicinity of the boundary along the first layer.

As the inside coating films, it is preferable that the first layer is composed of the phenolic epoxy resin type coating compound having high durability to deformation processing and the second layer is composed of the phenolic epoxy resin type coating compound having high corrosion resistance. In the case of the metal container having the third layer, the first layer and the third layer are preferable to be composed of the phenolic epoxy resin type coating compound having high durability to deformation processing and the second layer is preferable to be composed of the phenolic epoxy resin type coating compound having high corrosion resistance. Further, the second layer can be composed of phenolic epoxy resin type coating compound containing the pigment and the first layer can be composed of phenolic epoxy resin type coating compound containing no or smaller amount of the pigment. The first layer is preferable to be composed of phenolic epoxy resin type coating compound containing 10 to 30 wt %, particularly 15 to 20 wt % of phenol component, and the second layer is composed of phenolic epoxy resin type coating compound containing 20 to 50 wt %, particularly 22 to 30 wt % of phenol component, and the amount of the phenol component contained in the first layer is 1 to 20 point, particularly 2 to 10 wt % less than that contained in the second layer, wherein the "point" means the figure difference in the percent.

The metal container is preferable to have the first layer composed of phenolic epoxy resin type coating compound using low-molecular weight epoxy resin, for example, the average molecular weight of 2,000 to 7,000 epoxy resin and to have the second layer composed of phenolic epoxy resin type coating compound using high-molecular weight epoxy resin, for example, the average molecular weight of 5,000 to 20,000 epoxy resin. And it is preferable for the metal container to have the first layer composed of water-based epoxy acrylate resin type coating compound using low-molecular weight epoxy resin and to have the second layer composed of water-based epoxy acrylate type resin type coating compound using high-molecular weight epoxy resin.

The method for manufacturing an inside-coated metal container of this invention is characterized in comprising a process of forming a cylindrical container body from a material; coating a coating compound of a first layer having high durability to deformation processing at least on an inner surface of a vicinity of one opening of the container body; coating a coating compound of a second layer having corrosion resistance at least on a part of the first layer by wet on wet process; hardening the coating compounds; processing a high degree of a deformation processing on the vicinity of one opening; thereby covering the entire inner surface of the container with the first layer and/or the second layer.

The second embodiment of this invention of the method for manufacturing an inside-coated metal container is characterized in comprising a process of forming a cylindrical container body from a material; coating UV ink at least on an part or a whole of the inner surface of the container body; hardening the UV ink by the ultra violet rays illumination; coating a coating compound of a first layer having high durability to deformation processing at least on the inner surface of a vicinity of one opening of the container body; coating a coating compound of the second layer having high corrosion resistance at least on a part of the first layer by wet on wet process; hardening the coating compounds; processing a high degree deformation processing on the vicinity of one opening; thereby covering the entire inner surface of the container with the first layer and/or the second layer.

The second embodiment of this invention of the inside-coated metal container in which the high-degree deformation processing is applied to the vicinity of opening of one end after the coating of the inner surface is characterized in that the coating film formed by the coating comprises the first layer composed of Ultra Violet ink laid on the whole or a part of the inner surface of the container and the second layer composed of coating compounds having high durability to deformation processing or high corrosion resistance laminated over a part or whole of the first layer.

The third embodiment of this invention of an inside-coated metal container, in which a high-degree deformation processing is applied to the vicinity of opening of one end after coating the inner surface is characterized in that the coating film formed by the coating comprises the first layer composed of hot-melt agent laid on the whole or at least a part of the inner surface of the container and the second layer composed of coating compounds having solvent with high durability to deformation processing or solvent with high corrosion resistance laminated over a part or whole of the first layer.

The thickness of the first layer is preferable to be 3 to 100 μm. Further it is preferable that the first layer is composed of radical polymerization type UV ink and the second layer is composed of epoxy resin type coating compound.

The capped metal container of this invention comprising the metal container with thread and the cap engaging with the threaded opening is characterized in that a circular concave catching part protruding inward to the container is provided under the thread part of the container; the cap has the external cylinder having a threading process provided inside and an internal cylinder provided inside with the gap to the external cylinder; and the concave catching part of the container and the outer surface of the internal cylinder of the cap has such a dimension as to be fitted each other with sealing effects.

The Action and Effect of this Invention is Described Below

The inside-coated metal container of this invention has the first layer with high durability to deformation process at least on the vicinity of one opening edge. Therefore in the case that a high-degree deformation processing is applied to the vicinity of the opening, cracks or peelings of the inside coating film is hard to occur. Resultantly, there is only a minor risk of metal surface corrosion due to the seepage or penetration of contents through the coating film.

Furthermore, since the second layer having high corrosion resistance is laid at least on the area where the low-degree deformation processing is applied, the area has particularly high corrosion-resistivity to prevent the metal surface corrosion and bronzing due to the content, thereby reducing the possibility of penetration of the metal into contents. Accordingly, the metal container has totally high corrosion-resistivity not only in the area of high-degree deformation processing but also in the other area.

In the case that the metal container is a mono-block container processed by impact processing, deep drawing, or drawing-ironing, since this is seamless, the chance of appearance of cracks or peelings of the inside coatings film are very slim. Even in the case when the threading process is applied to the mouth of the container, there is only a minor risk of occurring cracks or peelings.

In the case that coating films composed of UV ink or hot-melt agent is laid entirely on the inner surface of the metal container, the coating films furthermore protect the inner surface of the metal container. The weight of a coating film formed from a regular solvent coating compounds remains only about 30% of the original weight coated as a film. Contrary, the weight of a coating film of UV ink and hot-melt agent remains about 100% of the original weight coated, thereby being able to form desired thickness. The thickening prevents forming of pinholes and improves the results of electric current flow test (decrease of the current flow).

In the case of using UV ink as the third layer, illumination of ultra violet rays easily harden the coatings, thereby simplifying the required manufacturing facilities. And it shortens the hardening time to make it suitable for mass production. Further, in the case that the third layer is wholly covered with the first layer and the second layer, these effects can be maintained for long hours.

In the case that hot-melt agent is used as the third layer it can be hardened in a short time to make it suitable for mass production. Furthermore, it has little effects on human body and has great stability suitable for long time storage.

The metal container having the first layer laid entirely on the inner surface and the second layer laid entirely on the first layer have a surface seamlessly covered by one layer to present high durability. The first layer can be laid easily by using conventional coating facilities. Since the second layer is laid over the first layer, higher durability is obtained. Furthermore, the second layer contacts directly to the contents, high protecting action to the contents is obtained. In the case that the second layer is laid over the whole area of the first layer, the conventional coating facilities can be used without any change. Since the entire first layer is covered with the second layer, the higher protecting action to the contents is obtained. The second layer has only a minor risk of occurring cracks during the processing even in the area of high-degree of deformation processing due to the cushioning action of the first layer. In the case that the second layer is laid only on the area having low-degree deformation processing, coating compounds can be saved.

In the case that the first layer is laid only on the area of high-degree deformation processing and the second layer is laid entire area including the first layer, the coating compounds for the first layer can be saved. Additionally, the first layer having not so high corrosion-resistivity is protected by the second layer having high corrosion-resistivity. Since the relatively hard second layer is laid over the relatively soft first layer, there is a merit that cracks and peelings are hard to occur compared with the case in which it is laid directly over the metal surface. Thus, the first layer and the second layer mutually act complementally.

In this case, the metal container in which the third layer of the same material as the first layer is laid over the second layer within the area corresponding to the first layer, the durability of the area against the high degree deformation processing is further improved.

In the metal container in which the first layer is laid on the area of high-degree of high degree deformation processing and the second layer is laid on the rest of the area and on the vicinity of the first layer to overlap the border along the first area the whole area is covered by almost one layer. The coating compound of the first layer and the second layer can be saved, further presenting high durability to deformation processing at the area of high-degree deformation processing and high corrosion-resistivity at the area of low-degree deformation. Accordingly, in the area of high-degree deformation, cracks and peelings are hard to occur presenting high corrosion-resistivity as a whole.

In the case that the first layer of the inside coating is composed of phenolic epoxy resin type coating compound having high durability to deformation processing and the second layer is composed of phenolic epoxy resin type coating compound having high corrosion resistance, the first layer and the second layer are composed of the material having the same property, therefore the sealing performance and the adhesiveness of the both layers in the border area are high. Thereby prevents peelings of the coating film at the border area due to the necking process after forming coating films. The phenolic epoxy resin type coating compound is a hardening coating compound having high adhesiveness to metal compared to other synthetic resin coating compounds and have high durability to deformation processing and corrosion-resistivity. Accordingly, it means that the first layer having high durability processing is superior in the durability to plastic working compared to the second layer. And the second layer is superior in corrosion-resistivity compared to the first layer. Therefore, by separately coated the inner surface with the coating compound of the first layer and the coating compound of the second layer, a coating film having less cracks and peelings in the area of high-degree deformation processing and stronger resistance against the corrosion of content in the area of low-degree deformation processing is obtained, compared to the coating film having single layer composed of the phenolic epoxy resin type coating compound. Further, in the case that the third layer of the metal container composed of phenolic epoxy resin type coating compound having high durability to deformation processing, the peelings between the layers are hard to occur.

In the case that the second layer is composed of phenolic epoxy resin type containing pigment and the first layer is composed of phenolic epoxy resin containing no pigment or less pigment than the second layer, the second layer is harder than the first layer and has high corrosion-resistivity. Further, the first layer is relatively soft and has high durability to deformation processing. Additionally, in the case that the first layer contains no pigment, it is inexpensive.

In the case that the first layer is made of phenolic epoxy resin type coating compound containing 10 to 30 wt %, particularly 15 to 20% of phenol component, the second layer is made of phenolic epoxy resin type coating compound containing 20 to 50 wt %, particularly 22 to 30% of phenol component, and further the phenol component in the first layer is 1 to 20 point, particularly 2 to 10 point less than that of the second layer, the same effects as described above are obtained. The coating film may be obtained by storing the phenolic epoxy resin type coating compound for the first layer (or for the second layer) temporarily; dividing as prescribed when using it; adding the phenol component to the one side of the stored resin (or removing the phenol component) and polymerizing the components of the coating compounds.

In the case that the metal container in which the first layer is composed of phenolic epoxy resin type coating compound using high-molecular weight epoxy resin and the second layer is made of phenolic epoxy type resin coating compound using low-molecular weight epoxy resin, the adhesiveness between the first layer and the second layer is high because they have similar property. The phenolic epoxy resin type coating compound is used as solvent coatings compound by mixing the phenolic epoxy resin with oil-based solvents and the like, and it is suitable for containers of hair dye, additive for gasoline etc., excepting drinks. The coating compound of the first layer and the second layer can be blended by adjusting the molecular weight when they are used under the preparation of coatings using appropriate molecular amount of epoxy resin.

In the case of the metal container in which the first layer is made of water-based epoxy acrylic resin type coating compound using low-molecular weight epoxy resin and the second layer is made of water-based epoxy acrylic resin type coating compound using high-molecular weight epoxy resin, since the water-based coatings are used, the coatings have good flavor and are suitable for container for drinks (regular drawing-ironing can, threaded drawing-ironing can etc.).

Since in the method for manufacturing the inside-coated metal container, a cylindrical container body is formed from a metal material and the coating compound of the first layer having high durability to deformation processing is coated at least on the inner surface of the vicinity of the opening provided on one end of the container body, the chances of crack initiation and peeling initiation of the coating film are very small although the high-degree deformation processing is applied to the vicinity of the opening. Furthermore, the coating compound of the second layer having high corrosion resistance is coated at least on the first layer by wet on wet process so as to overlap at least a part of the first layer, and then the coating compounds are hardened, the area of low-degree deformation processing in the metal container has high corrosion-resistivity. Thereby enabling sufficient protection of the inner metal surface from its contents and protection of the contents from the metal. Overlapping the layers by the wet on wet coating process can shorten the coating process. High adhesiveness of the border part of the both layers prevents seepage of the contents from the border part in the case that high-degree of deformation processing is applied to the vicinity of the opening. In the second embodiment of the manufacturing process of this invention, all of the compositions of the above manufacturing process are involved to act successfully. Further, since UV ink is coated on the entire inner surface of the metal container and hardened by illumination of ultra violet rays before the coating of the first layer and the second layer, the coating film having higher resistance to deformation processing and higher resistance to corrosion can be laid over with minimum facilities and the required processing time. Since the UV ink is hardened by illumination of ultra violet rays before the coating of the first layer and the second layer, there is only a minor risk of the photo polymerization initiator and the photosensitizer contained in the UV ink to be mix in the first layer and the second layer.

In the second embodiment of the metal container of this invention, since the first layer made of UV ink is laid on the entire inner surface of the container, there is only a minor risk of occurring pinholes through which the contents seep into the inside coating to corrode the metal surface. Further, because the coating can be formed as prescribed thickness, the layer having minor pinholes can be formed. In the case that the second layer made of solvent type coating compound having high durability to deformation processing is laid at least on the area of high-degree deformation processing between the first layer and the metal surface, cracks and peelings in the area are further hard to occur. In the case that the second layer made of solvent type coating compound having high corrosion resistance is laid at least on the area of low-degree deformation processing, the corrosion-resistivity of the inside coating is further improved. In the case that the second layer is laid on the entire first layer, the surface of the coating film that contact with the content has no UV ink making it suitable for long hour storage. In the third embodiment of this invention, since the first layer made of hot-melt agent is laid entirely on the inner surface of the container, the advantage is obtained same as the second embodiment described above. Because the hot-melt agent does not contain photo polymerization initiator and photosensitizer, the effects against the human body are slim.

In these metal container, making the thickness of the first layer made of UV ink or hot-melt agent to be 3 to 100 μm, the advantages described above can be obtained more effectively. In the case that the first layer is composed of radical polymerization type UV ink and the second layer is made of epoxy resin type coating compound, the adhesion between the layers is strong and there is only a minor risk of peelings.

In the threaded metal container of this invention, by tightening the screw of the cap and the container each other, the inside of the catching concave part of the metal container and the outer surface of the internal cylinder of the cap fit to act as a seal, thereby preventing penetration of contents into the threaded part of the metal container. It protects the coating films damaged or weakened in adhesion or adherence against the metal surface by such high-degree plastic working as threading.

BRIEF DESCRIPTION OF DRAWINGS

FIG. 1a and FIG. 1c are cross sectional views of an embodiment of the metal container of this invention, and FIG. 1b is an extended cross sectional view of the substantial part of FIG. 1a.

FIG. 2a and FIG. 2c are cross sectional views of an embodiment of this invention, and FIG. 2b is an extended cross sectional view of the substantial part of FIG. 2a.

BEST MODE FOR CARRYING OUT THE INVENTION

Figure 1:
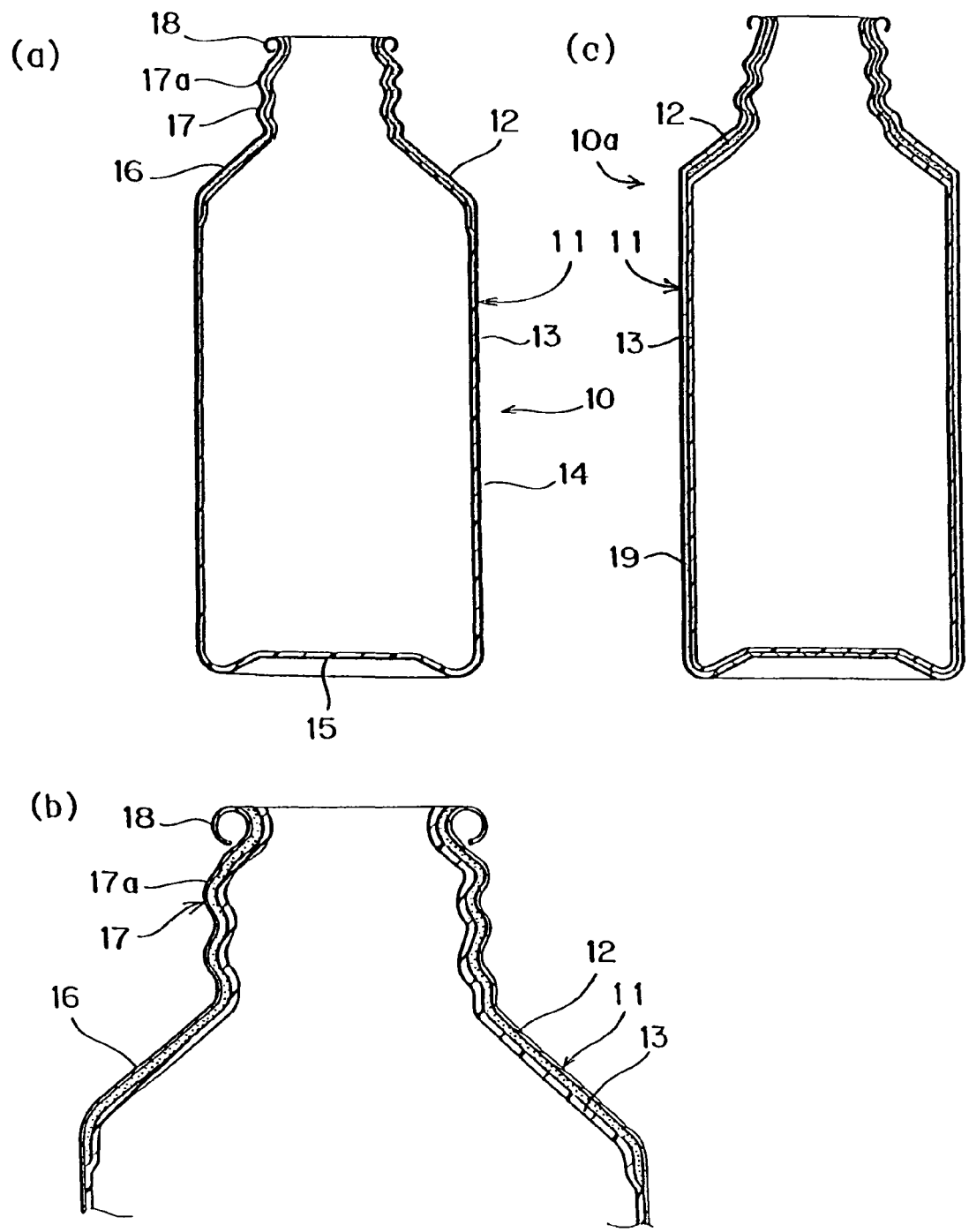

The inside-coated metal container of this invention and its manufacturing method is described below referencing the drawings. The inside-coated metal container (metal can) 10 shown in FIG. 1 comprises the can 11 and the coating film (12, 13) coated inside. The can 11 is a mono-block can plastically deforming the metal sheet made of aluminum etc. by stamping. The can 11 comprising the cylindrical body (side wall) 14, the bottom 15 closing its lower end, the truncated cone like shoulder 16 continuing from the upper end of the body, the cylindrical neck part 17 extending upward from the shoulder. The curling 18 winding outward is provided on the upper end of the neck part 17, and the thread 17a is formed around the neck part. In this embodiment, the coating films (12, 13) is composed of the first layer (foundation layer) 12 having high durability to deformation processing which is provided over the area from upper end of the body 14 to the shoulder 16 and the neck part 17, and the second layer (surface layer) 13 having high corrosion resistance which is provided over the entire inner surface including the first layer 12. This is applicable to a two-piece can in place of the mono-block can.

The manufacturing method of this metal container 10 is as follows. A blank material punched out from a thin metal sheet is formed by deep drawing-processing using stamping machine to form a bottomed cylinder, and in the case of drawing-ironing can, the body of the cylinder is further processed by ironing to make body thin. The obtained bottomed cylindrical can body is coated with the first layer by powder coating or by spraying on the prescribed area in the vicinity of the inner surface of the upper end opening. In the condition of wet on wet, in other words, in the condition that the first layer is not yet dried and hardened (baked), the coating compound of the second layer 13 is coated by spraying. And then, all the coating compounds are dried and hardened to form the first layer 12 and the second layer 13 of the coating film. After forming inside coating film, the shoulder 16 and the neck part 17 is formed by necking. Further, the threading (beading); The obtained metal container is washed and filled with contents.

The thickness of the first layer 12 and the second layer 13 of the inside coating film is determined depending on the property and the thickness of the metal, and the property of the contents. The thickness of the first layer 12 is usually about 2 to 8 μm, particularly about 3 to 5 μm and the thickness of the second layer 13 is usually about 2 to 10 μm, particularly about 4 to 7 μm. For each layer, various materials may be used depending upon the property of the metal and the contents. However since the layers are laid on the inner surface of the metal container, the materials are preferable to have high adhesiveness and agglutinability to metal surface, which is high film forming ability, durability, and elasticity. As such materials hardened synthetic resin are preferable, particularly thermosetting resin containing epoxy group, phenolic synthetic resin, epoxy phenoic urea resin are preferable. In these materials, phenolic epoxy resin having high durability to deformation processing, and corrosion-resistivity is preferable. Further, since the first layer 12 and the second layer 13 are overlapped each other, the same kind of synthetic resin or the one having high compatibility such as the resin soluble to the same solvent, or the resin hardened by bridging each other may be preferable.

For example, the combination of the first layer formed by using phenolic epoxy resin type coating compound having high durability to deformation processing and the second layer formed by using phenolic epoxy resin type coating compound having high corrosion-resistivity is preferable. For an example of the combination, as the first layer, phenolic epoxy resin type coating compound containing no pigment or small amount of pigment is used, and as the second layer, phenolic epoxy resin type coating compound containing lager amount of the pigment than that of the first layer is used. The reason is that the phenolic epoxy resin type coating compound containing no pigment is relatively soft and has slim risk for cracks and peelings when high-degree deformation processing is applied. And that the resin containing the pigment is hard and has high corrosion-resistivity, however has bad deformation processing durability.

As the pigment to be contained in the second layer, inorganic pigment such as oxidized titanium can be cited. However, organic pigment can be cited as far as it improves the corrosion-resistivity. The content of the pigment is preferable to be 20 to 80 wt %, particularly 40 to 60 wt %. When the content of the pigment is lower than 20 wt %, the corrosion-resistibility tends to be decreased, and when the rate is higher than 80 wt %, the deformation processing durability is rather degraded. The average particle diameter is not limited particularly, but it is usually made to be about 0.01 to 0.2 µm.

In the phenolic epoxy resin, it is that the more phenol component is contained the harder it becomes. Therefore, the coating of the first layer and the second layer can be obtained by blending the phenol component in the first layer to be 10 to 30 wt %, particularly 15 to 20 wt % and blending the phenol component in the second layer to be 20 to 50 wt %, particularly 22 to 30 wt %. In some metal containers, the phenolic epoxy resin type coating compound having low durability to deformation workability used for the second layer can be used as the coating compound of the first layer in the other metal containers of different kind of metal or those that does not manufacture with such high degree deformation processing. In this case also, the rate of the phenol component in the first layer is reduced to be 1 to 20 point lower, preferably 2 to 10 point lower than that of the second layer.

In the case that the molecular weight of the epoxy resin in the phenolic epoxy resin is high, the hardness of the resin increases and corrosion-resistivity increases. In the case that the molecular weight is low, the hardness of the resin decreases and the workability improves. Using this point, the first layer can be made of phenolic epoxy resin type coating compound using low molecular weight epoxy resin, and the second layer can be made of phenolic epoxy resin type coating compound using high molecular weight epoxy resin. In this case, rough standard of the molecular weight is, for the first layer, the average molecular weight of about 2,000 to 10,000, particularly about 2,000 to 7,000, and for the second layer, the average molecular weight of about 3,000 to 20,000, particularly about 5,000 to 20,000. The average molecular weight of the first layer is 1,000 to 10,000 smaller than that of the second layer.

Large or small of the molecular weight of the epoxy resin, more or less of the phenol component, and with or without of the pigment can be combined each other. For example, as the first layer, epoxy resin having low molecular weight is used together with the phenolic epoxy resin type coating compound containing small amount of phenol component, and as the second layer, epoxy resin having high molecular weight is used together with the phenolic epoxy resin type coating compound containing larger amount of phenol component. Further, in the second layer, pigment can be contained.

In the above embodiment, the use of resin coating of phenolic epoxy resin is mainly shown for the coating compound of the first layer and the second layer. However, for example, polyamide-imide resin type coating compound, polyamide resin type coating compound, vinyl chloride resin type coating compound, vinyl organosol resin type coating compound, polyolefin resin type coating compound etc. which are commonly used can also be used. Even in these cases, two kinds of the coating compounds whose difference is given in deformation processing durability and corrosion-resistivity depending on the presence and non-pretense of pigment, difference of molecular weight, existence percentage of the component may be fixed. And that the coating compound having higher deformation processing durability may be coated on the area of high degree deformation processing to form the first layer. And the coating compound having higher corrosion resistivity may be coated on the entire inner surface including the first layer to form the second layer. In this case also, when they are composed the same kind of resin coating compound, the adhesion between the layers is strong, and peelings are hard to occur in the border area.

The material of the first layer and the second layer can be used in combination of different kinds of material such as chloride vinyl type resin as the first layer and phenolic epoxy resin as the second layer having low durability to deformation processing and the high corrosion-resistivity.

Further, an under coat such as epoxy resin etc. can be laid in between the first layer or the second layer and the inner surface of the metal container, wherein other layer structure in which an interim layer such as made of epoxy resin may be employed in between the first layer and the second layer. The container 10a shown in FIG. 1c has three layers structure in which the third layer 19 made of UV ink is laid between the first layer and the second layer, and the inner surface of the metal container over the entire inner surface of the metal container. In this case, when the UV ink layer 19 is made thick, pinholes become few, preventing corrosion of the metal surface due to seepage of contents. By this method, it is possible to form the inside coating films having high durability without existence of UV ink on the surface of the coating film. The thickness of the third layer is preferable to be 3 to 100 µm, particularly, 20 to 80 µm. In the case that the coating compound made of epoxy resin type coating compound is used as the first layer and the second layer, and radical polymerization type UV ink is used, deposition or adhesion of the both layers is strong, and peeling between the both layers can be prevented. As such epoxy resin type coating compound, phenolic epoxy resin is preferable, and as the radical polymerization type UV ink, modified epoxy acrylates resin is preferable. The UV ink layer (third layer) 19 can be laid on as the most outside layer over the first layer and the second layer. In the case that it is laid as the most outside layer, provision of the UV ink layer 19 reduces pinholes and prevents corrosion of the metal surface due to seepage of contents.

As the third layer, hot melt agent can be used. This can provide thick layer like that of UV ink and prevents corrosion of the metal surface due to seepage of contents. The thickness is preferable to be 3 to 100 µm, particularly 20 to 80 µm. As such hot melt agent, polyamide hot melt, polyester hot melt can be cited, in which case, particularly taking into account of the paintwork, that of low melting viscosity whose range is less than about 200 dpa·s/200° C. is preferable.

In the case that the metal container 10a with the third layer 19 made of UV ink or hot melt agent laid over whole inside of the container is manufactured in the following procedures can be proceeded. A bottomed cylindrical container body is formed. An UV ink or hot melt agent is coated on the entire inner surface of the container. After hardening the UV ink or hot melt agent, the coating compound for the first layer 12 is coated on the area in the vicinity of the upper end of the bottomed cylindrical can by powder coating or spraying. And then, in the condition of wet on wet, the coating compound of the second layer 13 is laid entirely on the inner surface of the container. The first layer 12 and the second layer 13 are formed by drying and hardening the coating compounds. The necking, the curling, and the threading are applied to manufacture the metal container. The hardening of the UV ink is carried out by illuminating the inside-coated metal container with ultra violet rays.

Figure 7:
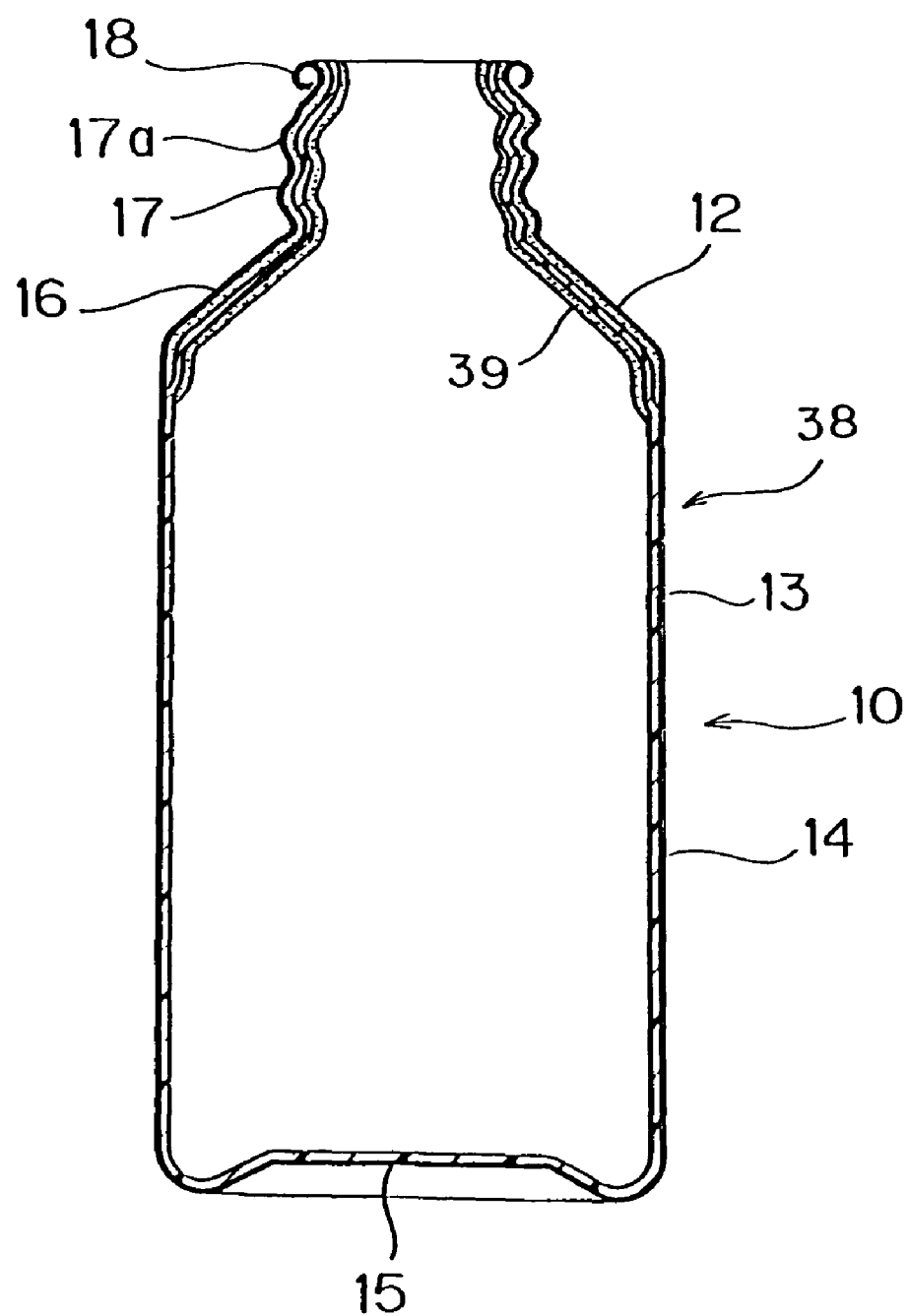
FIG. 7 is a cross sectional view of the other embodiment of the metal container of this invention.

Further, the metal container 38 as shown in FIG. 7 that have the three layers structure can be obtained, in which the first layer 12 is made of phenolic epoxy resin type coating compound having high durability to deformation processing, the second layer 13 is made of phenolic epoxy resin type coating compound having high corrosion-resistivity and the third layer 39 is made of phenolic epoxy resin type coating compound having high durability to deformation processing (See FIG. 7).

Figure 2:
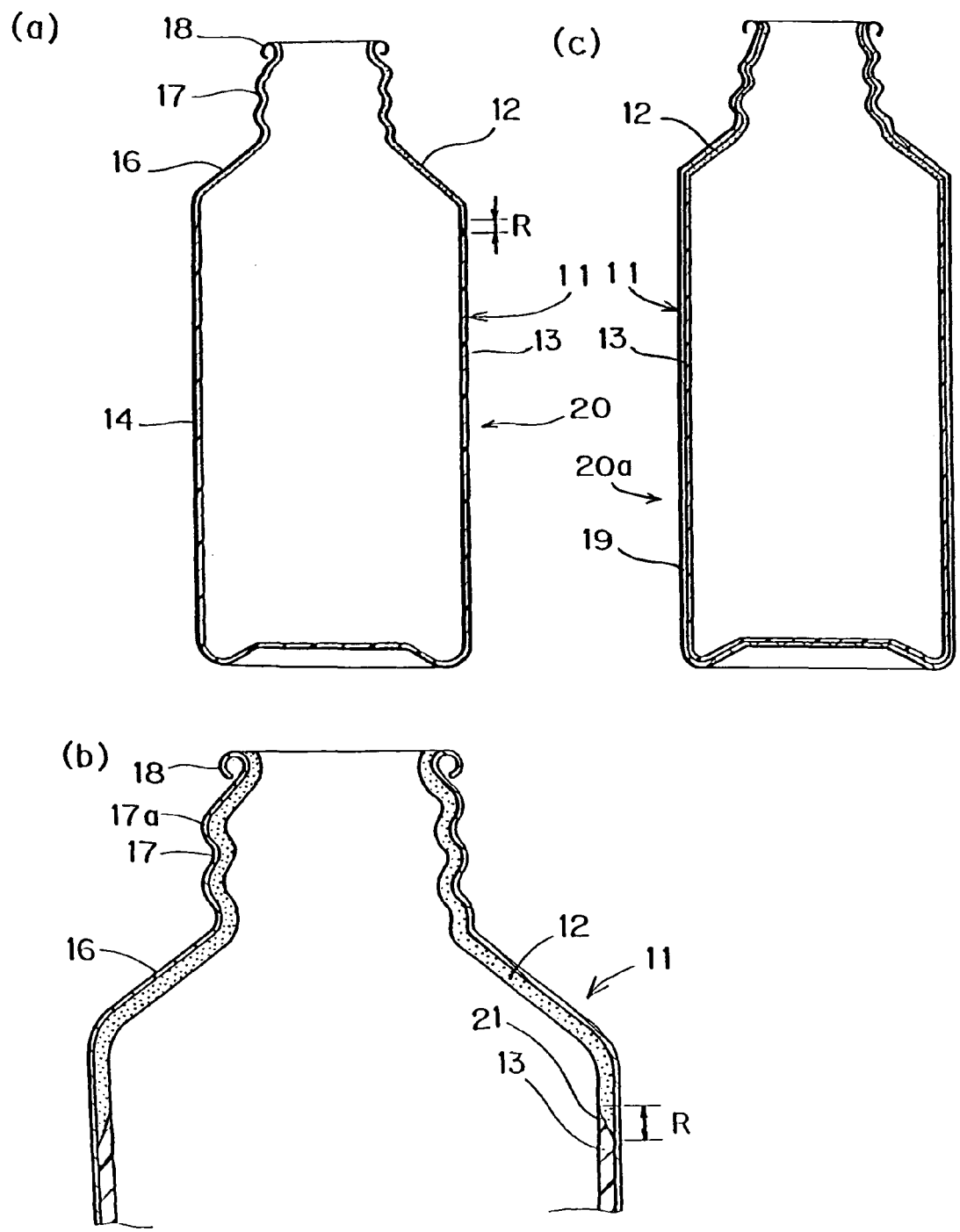
Figure 3:
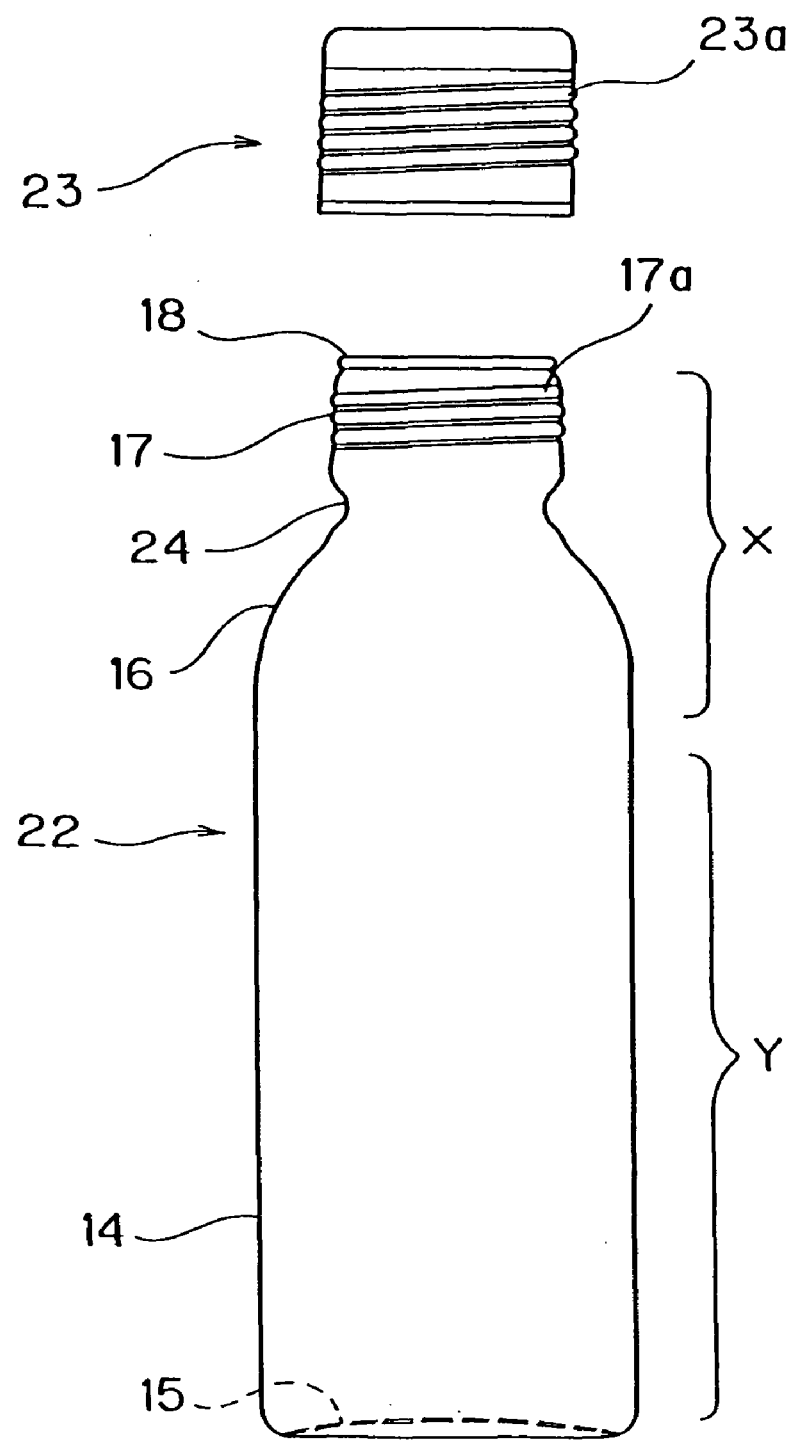
FIG. 3 is a side view of the other embodiment (threaded impact can) of the metal container of this invention.

FIG. 2a shows the metal container 20 in which the first layer 12 having high durability to deformation processing is laid over the area from the upper end of the body 14 of the can 11 to the shoulder 16 and neck part 17 and the second layer 13 having high corrosion-resistivity is laid over the other area, as same as the metal container 10 of FIG. 1. As shown in FIG. 2b, in the area shown by the sign R in the lower end of the first layer 12, a gradient plane 21 which gradually becomes thinner toward the lower end is provided, and the second layer 13 is overlapped on the plane forming the similar gradient plane. Accordingly, the thickness of the coating film of the area R is actually equal to the other area of coating film. It is possible as well to omit the gradient plane and just to overlap the films, where the thickness of the overlapped area R is thick. The manufacturing method of the metal container 20 is same as that of the metal container 10 shown in FIG. 1 and the only difference is that the coating of the second layer on the first layer 12 is omitted in the coating process of the second layer 13.

For the first layer 12 and the second layer 13 of the metal container 20, the combination of the two kinds of the material same as the described above embodiments can be employed. The thickness of the each layer is as the same as described above. But the thickness of the first layer 12 can be larger than that of shown in FIG. 1, thereby improves the corrosion-resistivity. In this embodiment, the first layer 12 contacts directly to the contents. However, in such metal container 20, the possibility of the contents to be filled up to the level of the shoulder 16 is low, and the level up to the neck part 17 is the lowest. Therefore, there is only a minor risk for the first layer 12 to be corroded by the contents. In this case, the cracks and the peelings of the coating film can be greatly avoided due to the high durability of the first layer to plastic working, despite the forming process of the shoulder 16 and the neck part 17 by the necking, the forming process of the curling part 18, and the forming process of the thread part 17a after forming the inside coating. Further, since the second layer 13 on the first layer 12 is omitted, the coating compound is saved as much. Same as FIG. 1c, the container 20a of FIG. 2c has the third layer 19 laid between the first layer, the second layer and the inner surface of the metal container, which is made of UV ink laid entirely on the inner surface of the container, thereby yielding fewer pinholes preventing corrosion of the metal surface due to seepage of contents.

FIGS. 3 to 6 shows the other applicable embodiments of the metal container to which the coating film of the first layer having high durability to deformation processing and the second layer having high corrosion-resistivity are coated separately. The metal container 22 shown in FIG. 3 has inside coating films laid over the impact can having so called threaded part. The can 11 is formed into cylindrical can with bottom by the impact processing and then the inside coating films is formed. A thin part 24 is formed between the neck part 17 and the shoulder 16 by the spinning processing. The thread part 17a is a male screw to screw in with the thread part 23a of the cap and holds air-tightness by screwing in. Therefore, the degree of the deformation processing of the thread part 17a is relatively high.

Figure 4:
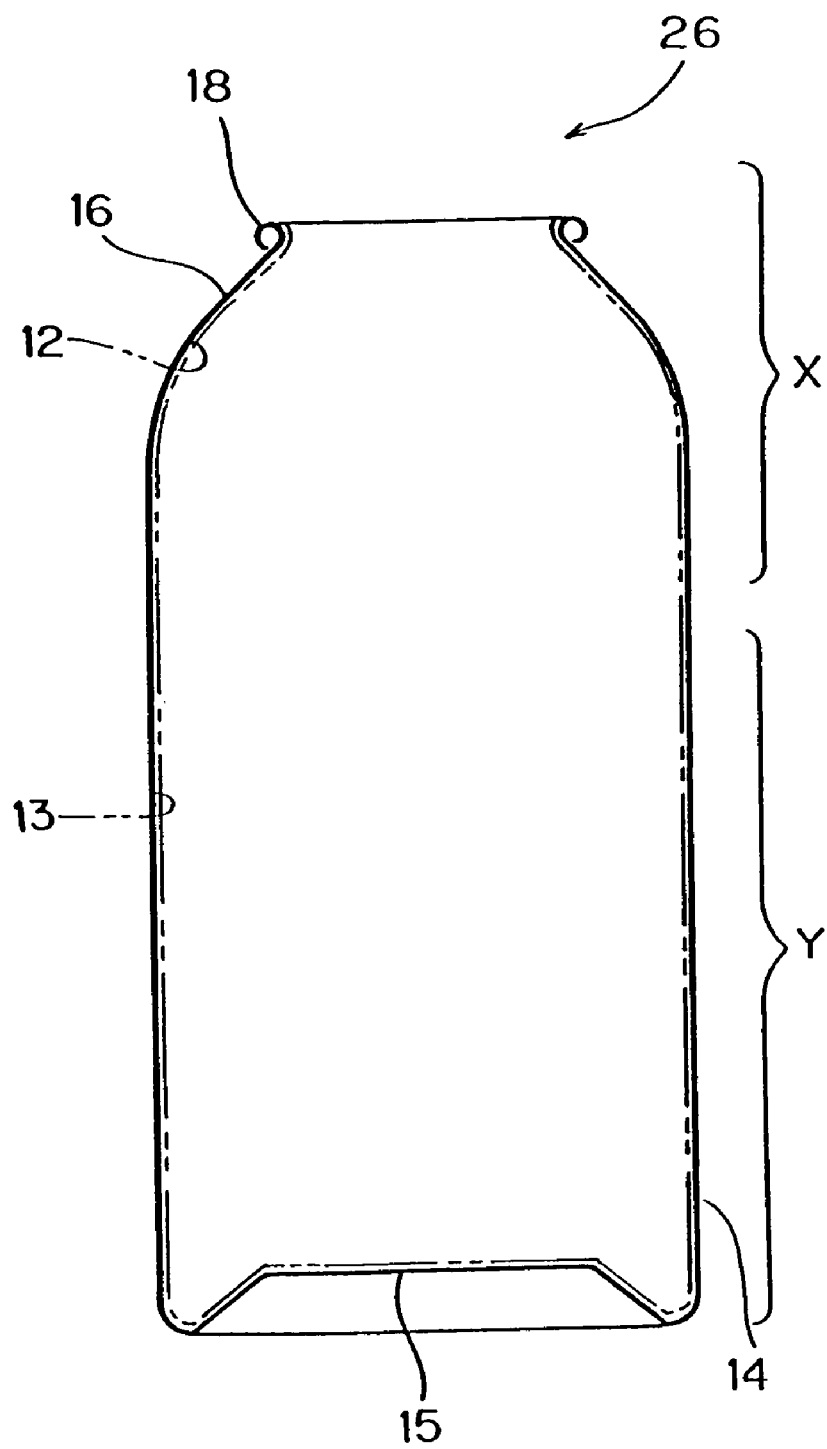
FIG. 4 is a cross sectional view of the other embodiment (common aerosol can) of the metal container of this invention.

The metal container shown in FIG. 4 shows a common aerosol can. This is formed from the slug of tin aluminum into a bottomed cylindrical by the impact processing. And after forming inside coating films, the shoulder 16 is formed by the necking, and the bead 18 is formed by the curling.

Figure 5:
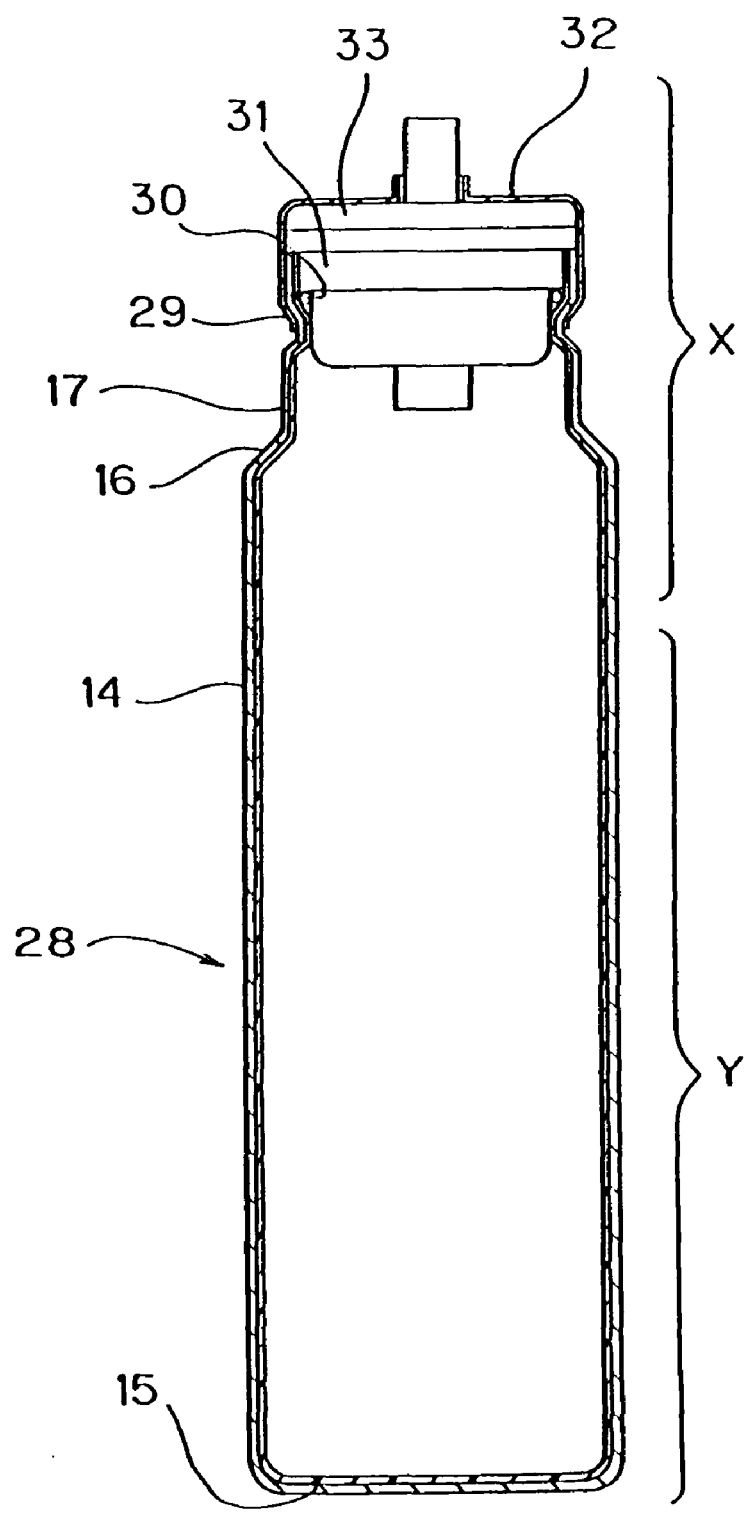
FIG. 5 is a cross sectional view of the other embodiment (compact aerosol can) of the metal container of this invention.

The metal container 28 in FIG. 5 is a compact aerosol container to which inside coating films are applied. This is formed from a metal sheet (slug) made of aluminum etc. into a bottomed cylindrical can by the impact processing. And after forming inside coating films, the shoulder 16 and the neck part 17 is formed, and a circular groove 29 is formed by the spinning processing in the neck part 17. The circular groove 29 is provided to fasten the valve 31 through the sealing material such as O-ring 30, and to caulk the lower end of the cap 32. The reference numeral 33 shows a gasket. The neck part 19 and the circular groove 29 also has high-degree plastic working for the valve 31 to be fit.

Figure 6:
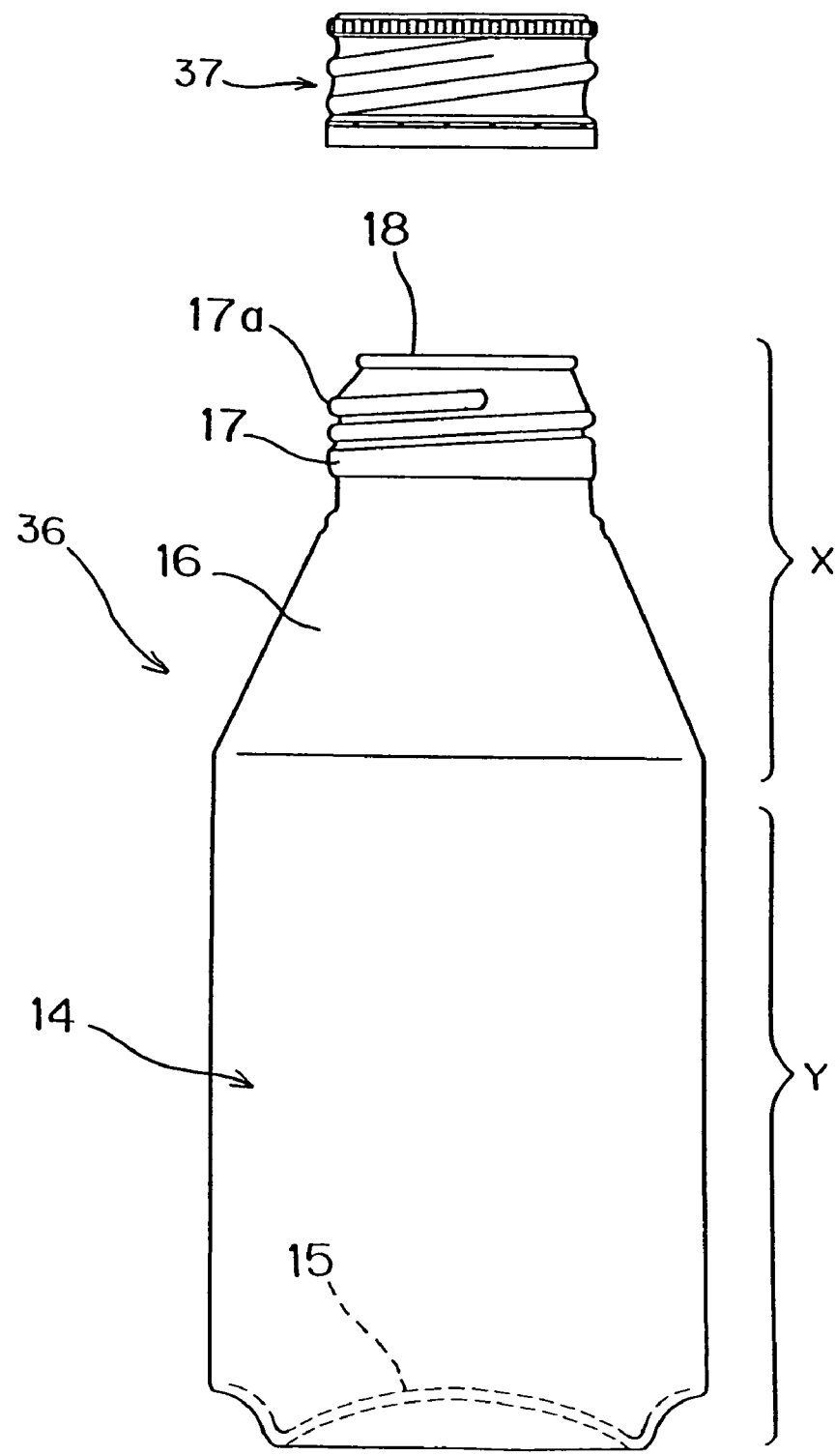
FIG. 6 is a side view of the other embodiment (drawing-ironing can having a thread part) of the metal container of this invention.

The metal container 36 shown in FIG. 6 is a so-called threaded drawn-ironing can inside of which is coated in order to contain cold drinks etc. The container 36 employs a cap 37 having a skirt which is to be broken when unsealing so as to indicate users to be not yet unsealed. The cap is the pilfer-proof cap (PP cap) or cap similar in other names, flavor cap or high-lock cap. For this purpose, the circular groove 29 is formed for caulking the lower end of the cap 37 between the shoulder 16 and the neck part 17 of the can 11. Because such cap 37 has high unit strength, the neck part 17 screwed in with the cap also has high unit strength and has high forming accuracy.

In any metal container 22,26,28,36 in FIGS. 3 to 6, the first layer same as described above is formed on the inner surface of the area X having high-degree deformation processing and the second layer described above is formed on the area Y having low-degree deformation processing (including the area not post-processed). The second layer can be laid over the first layer. In these metal containers, cracks and peelings due to the processing of forming the shoulder 16, the neck part 17, thread part 17a or circular groove 29, are prevented and corrosion-resistivity is high in the other area Y.

FIG. 7 shows the embodiment of the metal container 38 having three layers structure. In this container same as the metal container 10 in FIG. 1, the first layer 12 having high deformation processing durability is laid over the area of high-degree deformation processing, and the second layer 13 having high corrosion-resistivity is laid over entire inner surface including the entire first layer 12. In other words, the second layer 13 is laid over all the area X of high-degree deformation processing and the area Y of the low-degree deformation processing. In this embodiment, the third layer 39 having high durability to deformation processing is laid on the second layer 13 of the area X same as the first layer 12. In this embodiment, cracks and peelings of the coating films are furthermore prevented in the area of high-degree deformation processing. The coating compounds same as that of shown in FIG. 1 may be used for the first layer 12 and the second layer 13. The coating compound to form the third layer 39 can be same as that used for the first layer 12, and can also be a different coating as far as it has higher deformation processing durability than that of the second layer.

Figure 8:
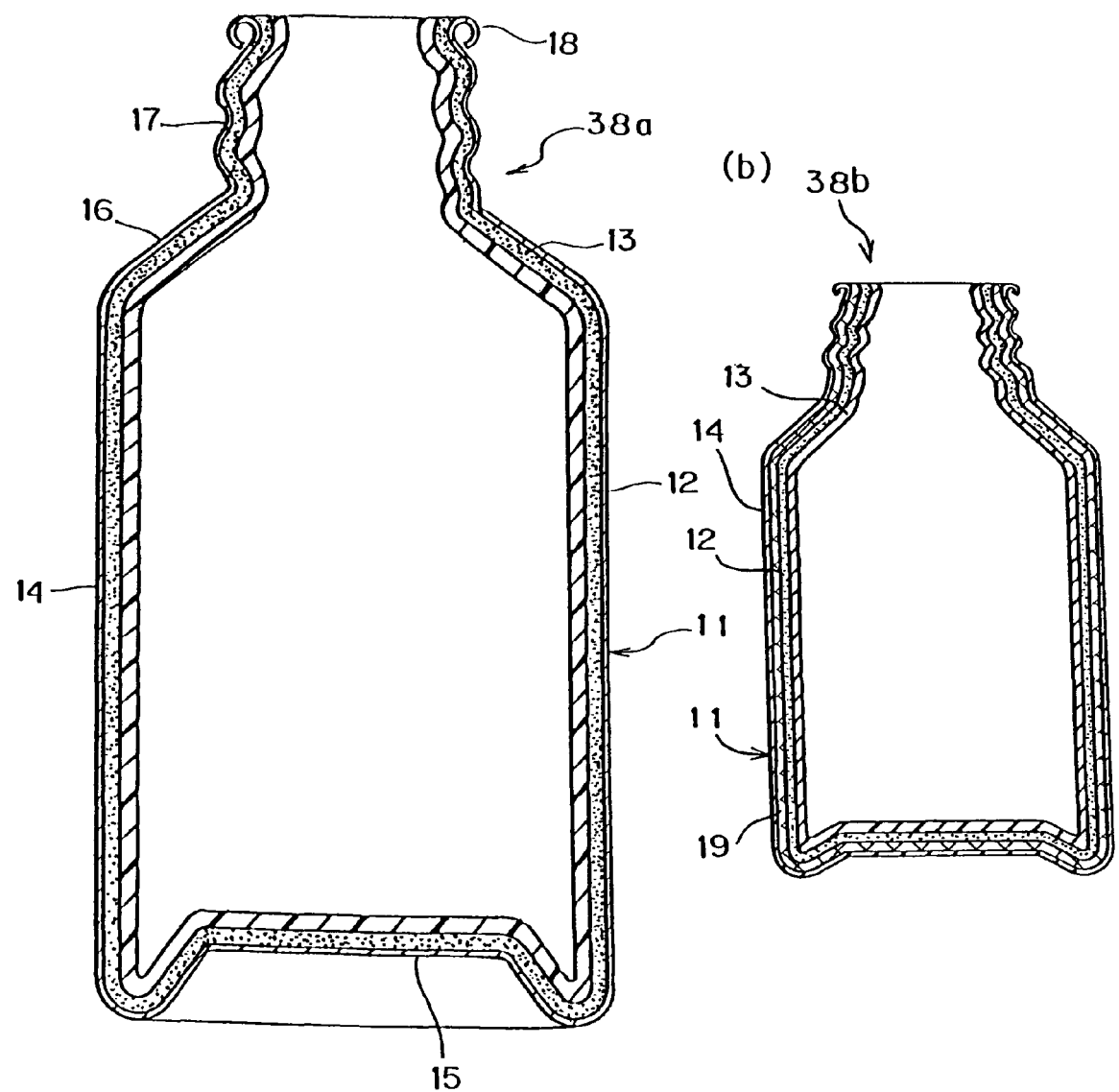
FIGS. 8a and 8b are cross sectional views of the other embodiment of the metal container of this invention.

In the metal container 38a shown in FIG. 8, two layers coating films are laid on the entire inner surface of the container. In other words, the first layers 12 having high durability to deformation processing is laid on entire inner surface of the container and the second layer 13 having high corrosion-resistivity is laid overlapping the entire first layer 12. For the coating compounds of the first layer 12 and the second layer 13, the same coating compounds used for the container shown in FIG. 1 is used. It is preferable for this container that after applying the coating compound of the first layer 12, the second layer 13 may be formed by wet on wet process and hardened by baking. This container has the first layer having high durability, because the first layer 12 has wholly seamless surface. Further, since the first layer 12 is wholly covered with the second layer 13 having high corrosion-resistivity, the container has high corrosion-resistivity as a whole container. In this container, the same thickness of the coating film as that of substantially single layer film shown in FIG. 2 can be used but the thickness of the each coating film can be thinned. For example, the thickness of the first layer 12 is 5 μm in the neck part 17, 4 μm in the body 14, and 5 μm in the bottom 15. In the metal container 38b shown in FIG. 8b, the third layer 19 made of UV ink is provided between the first layer and the inside of the metal container like the metal container FIG. 1. Thereby obtaining the same effect as that of the metal container 10b with UV ink. The thickness of the third layer 19 can be adjusted depending on the degree of the deformation processing applying to the container. For example, it is about 10 μm in the neck part, about 20 μm in the body 14, and about 20 μm in the bottom 15.

Figure 9:
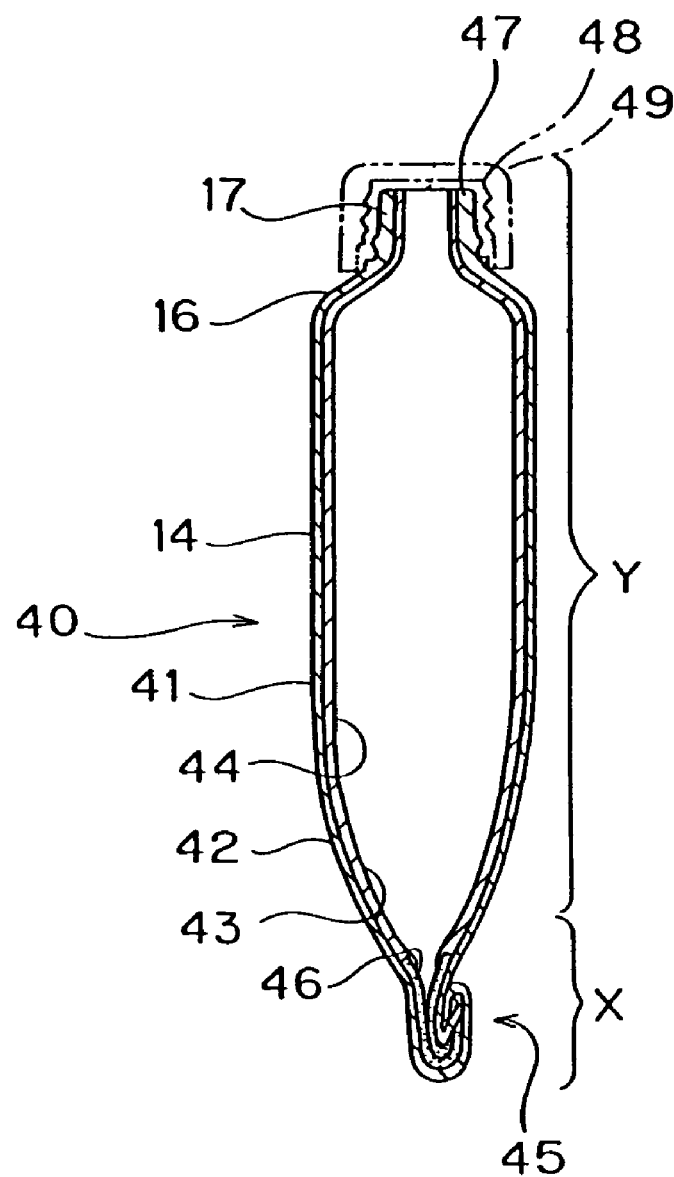
FIG. 9 is a cross sectional view of the other embodiment (metal tube) of the metal container of this invention.

FIG. 9 shows an embodiment suitable for the collapsible tube of the metal container of this invention. The collapsible tube 40 comprises the tube 41 made of metal and the coating films (44, 46) laid on the inner surface. The tube 41 comprises the cylindrical body 14, the truncated cone like shoulder 16 continuing from the upper end of the tube body, the cylindrical neck part 17 extending upward from the shoulder. The lower end hem of the tube body 14 is the clinched part 45 closed by clinching. Periphery of the neck part 17 is fitted with the thread screw part 48 and fixed. The threaded cap 49 is screwed in the periphery of the neck part 48. In the tube body 41, the body 14, the shoulder 16, and the neck part 17 are integrally molded by impact processing. Before the hem is clinched, that is, in the condition of FIG. 10a, coating and baking of the inner surface of the container is carried out to form the coating films (44, 46). After washing the inside of the container, the contents are charged from the opening (right end of FIG. 10a), and the hem is clinched to form the clinched part 45 as shown in FIG. 10b.

Figure 10:
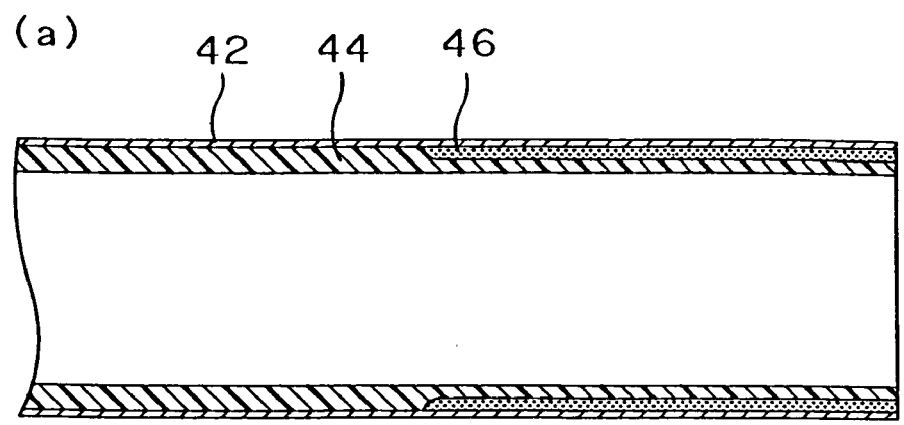
FIGS. 10a and 10b are cross sectional views of the other embodiment (metal tube) of the metal container of this invention showing those of before post-processing and after post-processing.
Figure 10:
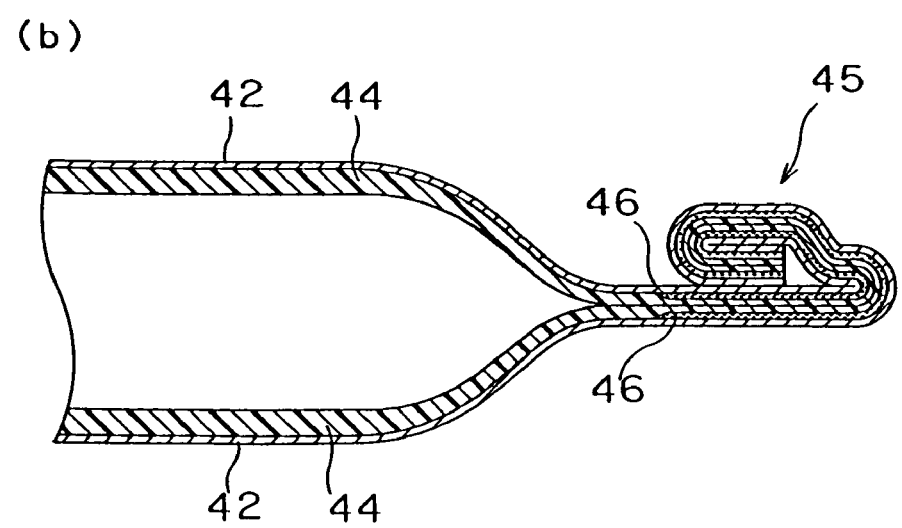

As shown in FIG. 10a and FIG. 10b, the coating films (44, 46) are composed of the first layer 46 having high durability to deformation processing laid on the inner surface of the clinched part 45, the second layer 44 having high corrosion-resistivity laid on the inner surface of the first layer 46 and the inner surface of the body 14, the shoulder 16, and the neck part 17. The thickness of the first layer 46 and the second layer 44 are about the same and are about 5 to 15 μm. The material of the first layer 46 and the second layer 44 are same as that of the metal container 10 of FIG. 1 and the same combination of material may be used. The thickness of the body 14 usually about 0.1 to 0.2 mm, in the case of aluminum.

In the collapsible tube 40, the second layer 44 having high corrosion-resistivity is laid on the inner surface of the body 14, the shoulder 16, and the neck part 17. Therefore the metal surface is sufficiently protected from contents. Further, since the post-processing (clinching processing) is not applied in the area Y, the relatively hard second layer 44 is not affected by clinching, thereby yielding no cracks and peelings. On the other hand, in the area X where the high-degree deformation processing is applied, that is the inside of the clinched part, the first layer 46 having high durability to deformation processing and the second layer 44 are laid respectively. Therefore, cracks and peelings do not appears on the area X where the clinching which is high degree deformation processing is applied, of course on second layer 44.

In this embodiment, the second layer 44 is laid on the entire first layer 46, but as same as FIG. 1, only an edge part of the second layer 44 can be laid over the first layer 46. In this cases the first layer 46 is exposed, but since the clinched part 45 does not contact to the contents, there is only a small risk to corrode.

Figure 11:
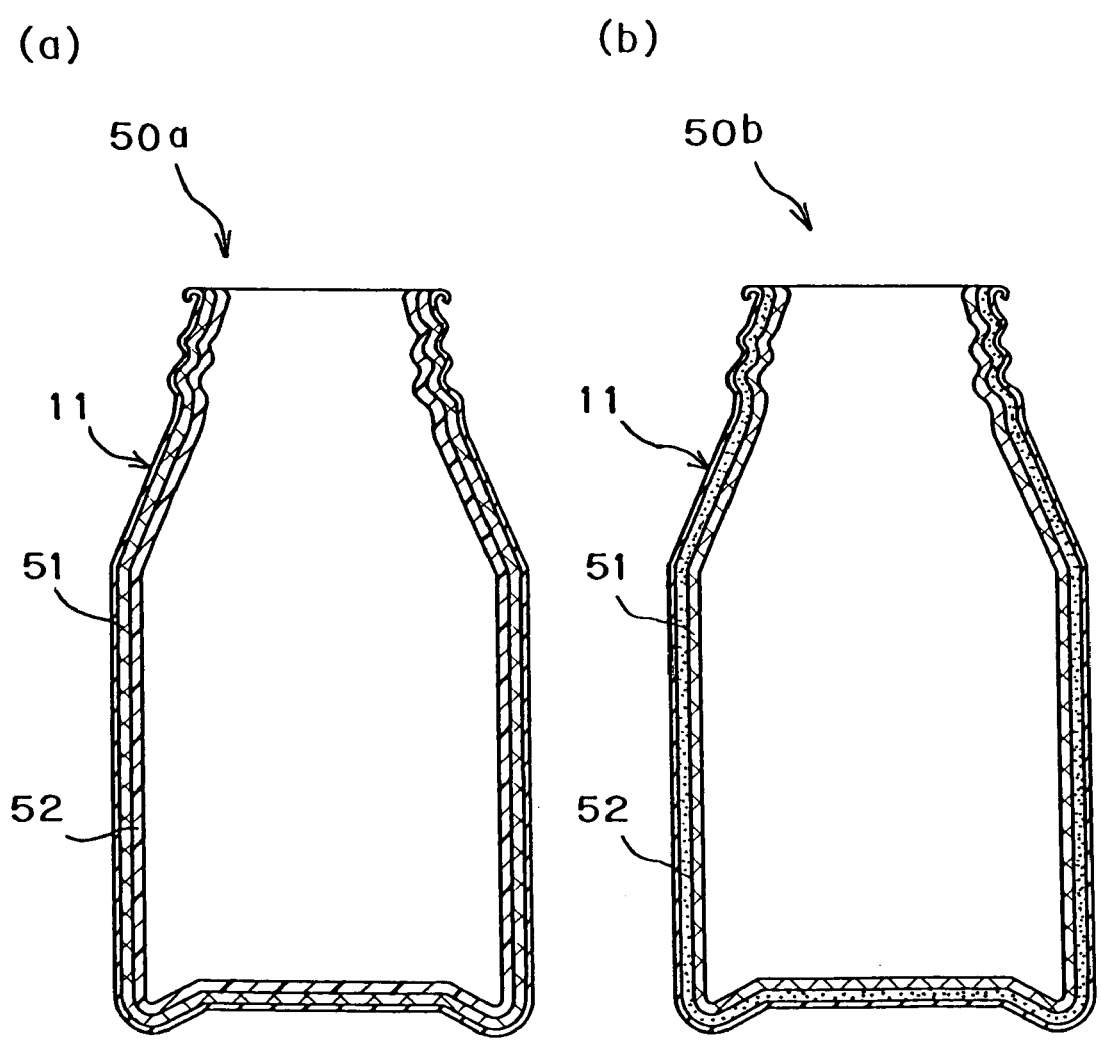
FIGS. 11a and 11b are cross sectional views of the other embodiment of the metal container of this invention.

In the metal container shown in FIG. 11a, the first layer 51 made of UV ink is laid on the entire inner surface of the can 11, and the second layer 52 made of coating compound containing high corrosion-resistivity solvent is laid on the first layer. In the metal container 50b shown in FIG. 11b, the second layer 52 made of coating compound having high deformation processing durability is laid on the entire inner surface of the can 11, and the first layer 51 made of UV ink is laminated on the first layer 52. Since the first layer made of UV ink can be made thick, only few pinholes appears on the layer preventing corrosion of the metal surface. Further, since the first layer made of UV ink can be hardened easily and in a short time by illumination of ultra violet rays after coating, the manufacturing facilities can be simplified making it suitable for mass production. The thickness is not restricted but preferable to be 3 to 100 μm, particularly 20 to 80 μm.

In such case as the metal container 50a, the second layer made of coating compound containing high corrosion-resistivity solvent is laid over the first layer, the corrosion-resistivity of the coating films is further improved. In such as the metal container 50b, the first layer is laid on the second layer made of coating compound containing solvent with high deformation processing durability, the adhesion between the coating films and the metal container is high further preventing cracks and peelings. The arrangement of the first layer and the second layer in the metal container 50a or the metal container 50b is not restricted and can be reversed without loss of the effects. However, the above order is most preferable. As such first and second layer, the combination of a free-radical polymerization type UV ink and epoxy resin type coating compound is preferable, which provides high adhesion between two layers and high durability. Particularly, as a free-radical polymerization type UV ink, acrylic modified epoxy resin is preferable, and as an epoxy resin type coating compound, phenolic epoxy resin is preferable.

The first layer of the metal container 50a shown in FIG. 11a can be made of the hot melt agent. In this case also, increasing the thickness of the first layer prevents occurring of pinholes and corrosion of the metal surface due to contents. Because the hot melt agent can be hardened in a short time, it is suitable for mass production. The thickness is not restricted, but is preferable to be 3 to 100 μm, particularly 20 to 80 μm. As such hot melt agent, polyamide type hot melt agent, polyester type hot melt agent can be cited.

Figure 12:
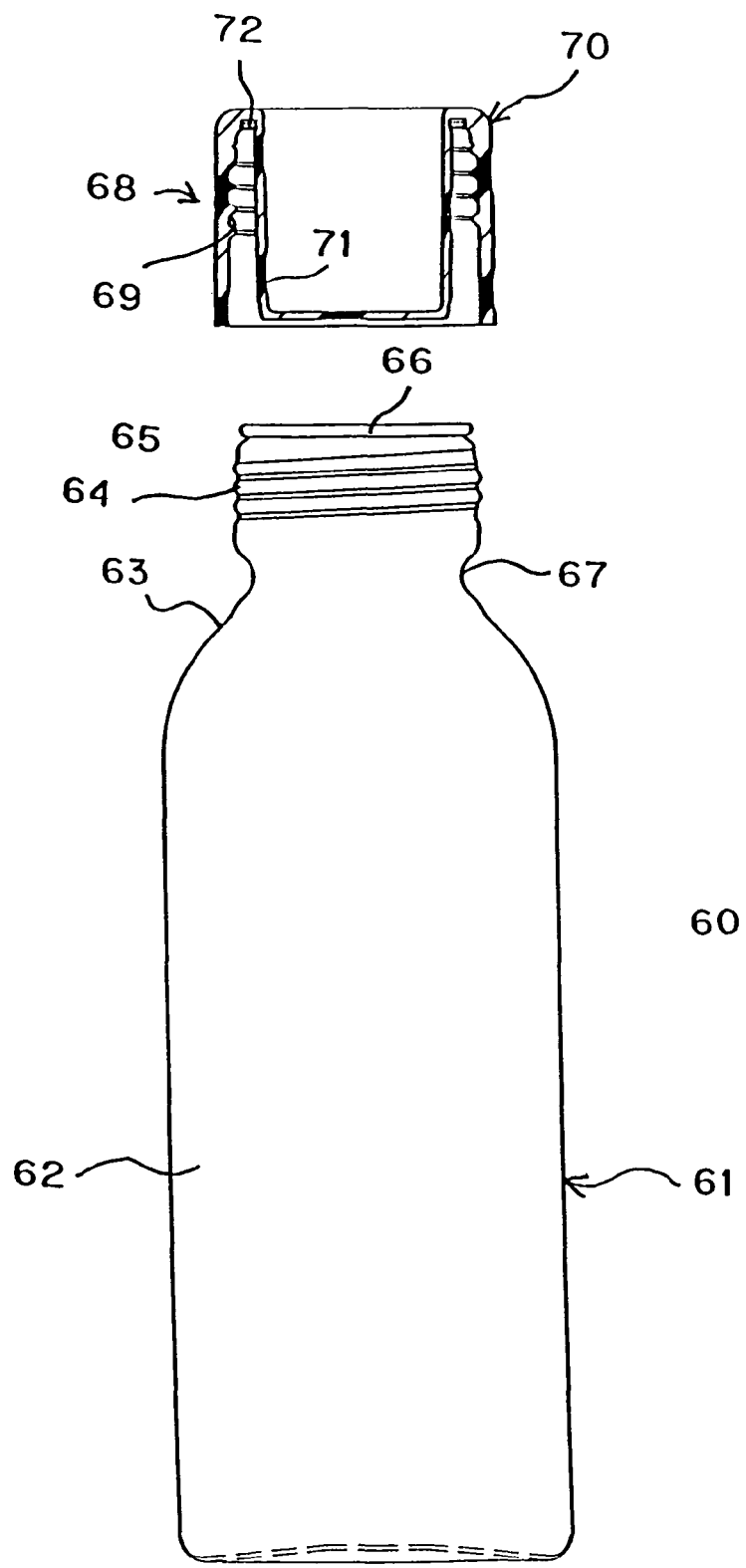
FIG. 12 is a cross sectional view of the threaded metal container of this invention.

The metal container 60 shown in FIG. 12 comprises the can 61 and the cap 68. The can 61 comprises the bottomed cylindrical body 62, the shoulder 63 provided on the upper end of the body 62 in tapered shape, the neck part 65 having a male screw 64 provided continuously on the top of the shoulder 63, and the bead part 65a provided on the opening of the upper end of the neck part. Between the shoulder 63 and the neck part 65, a catching concave part 67 protruding inward to the container is provided. The cap 68 is composed of an outer cylinder 70 having female screw in its inside, a inner cylinder 71 with bottom which is formed so as to enclose the inner surface of the outer cylinder 70 and where its opening is continued to the top surface of the outer cylinder, and a gasket 72 provided between the side wall of the outer cylinder 70, top surface of the outer cylinder 70, and the inner cylinder 71.

Figure 13:
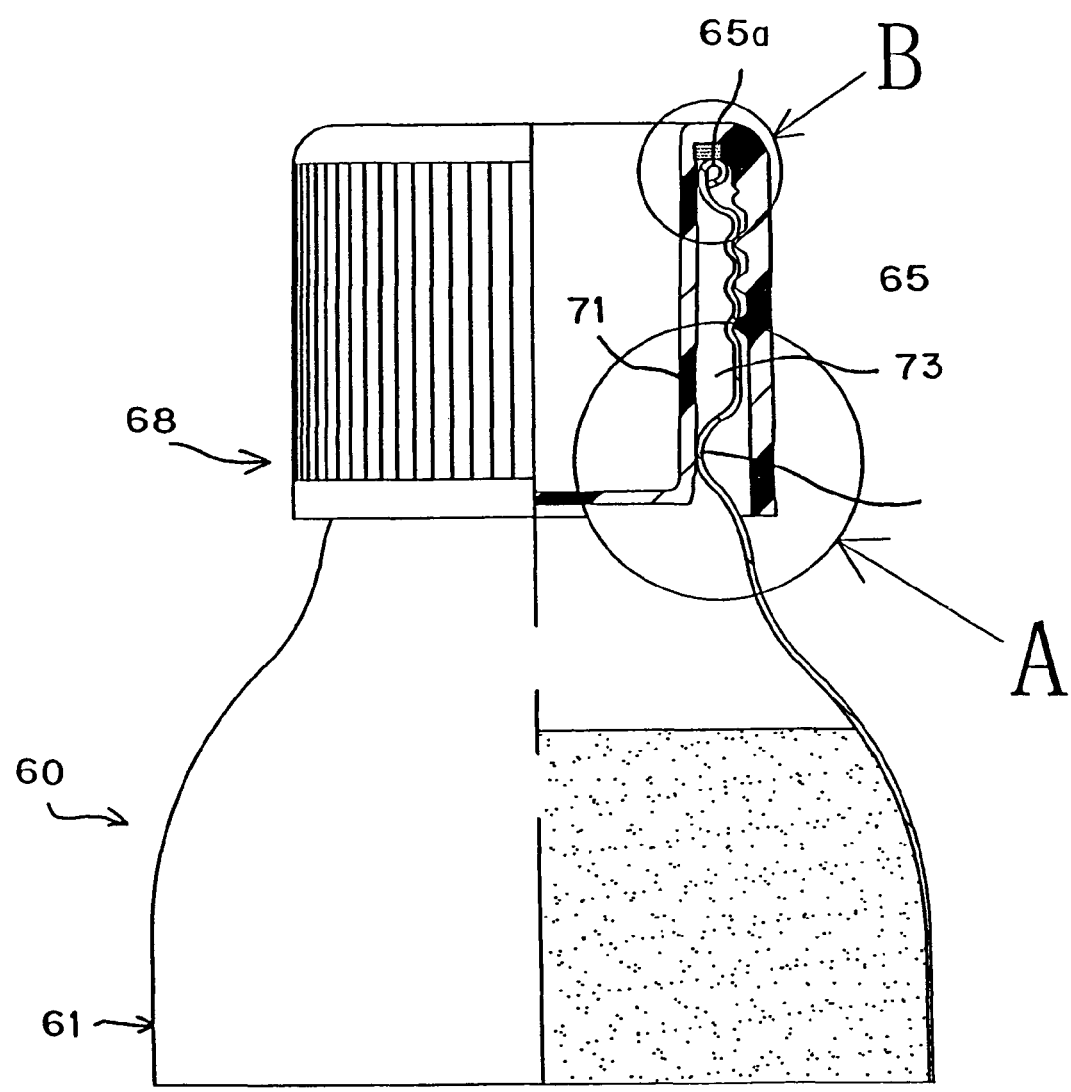
FIG. 13 is an extended view of the substantial part of FIG. 12.
Figure 14:
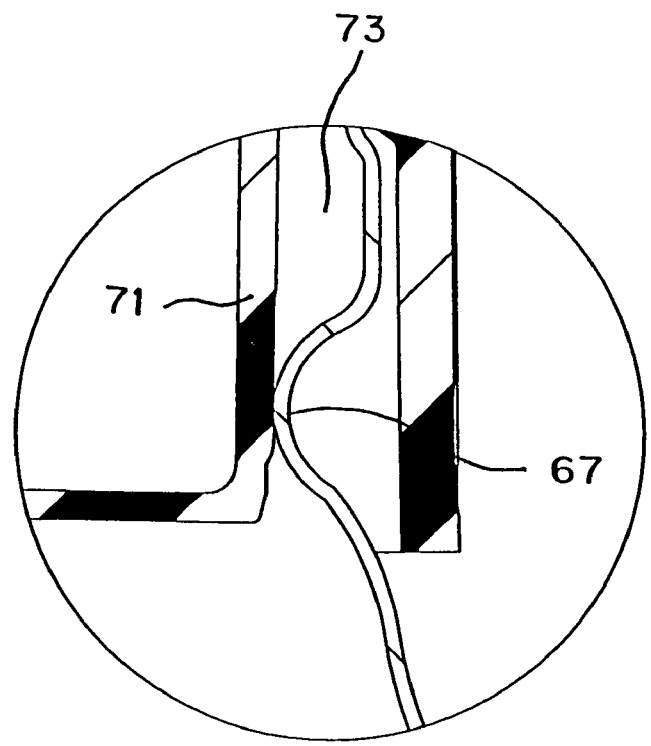
FIGS. 14a and 14b are extended views of the substantial part of FIG. 13.
Figure 14:
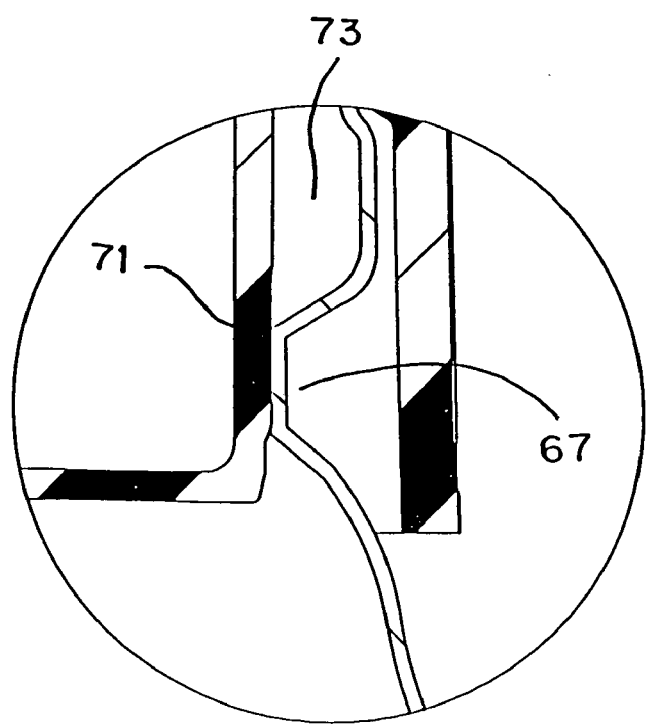
Figure 15:
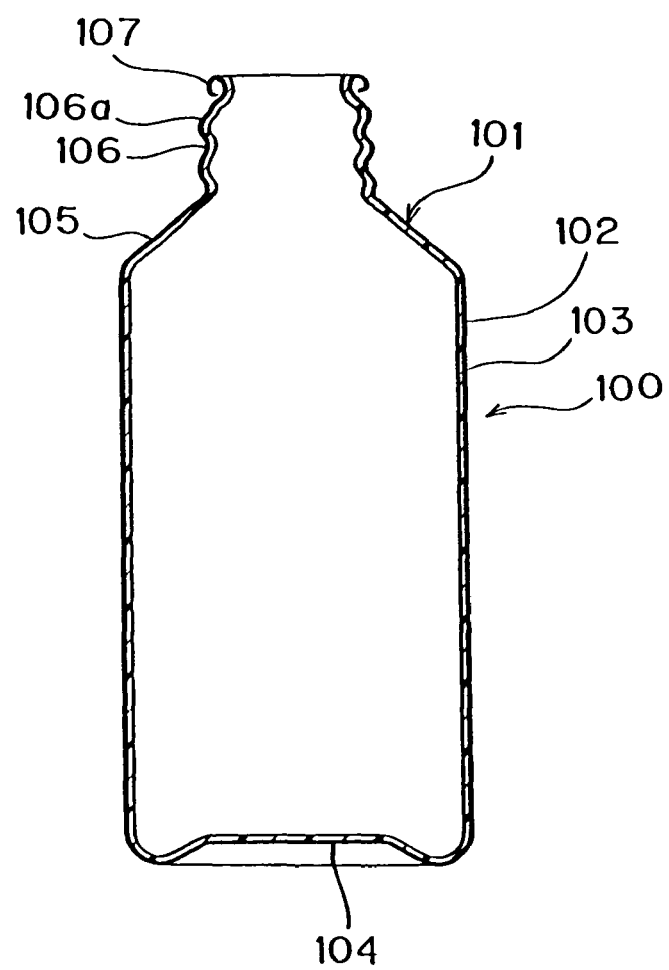
FIG. 15 is a cross sectional view of an example of conventional metal containers.

FIG. 13 is a state diagram of the can 61 and the cap 68 being screwed in. As shown in FIG. 13, the threaded metal container 60 whose can 61 and the cap 68 is screwed in, composes a double-sealing structure in which the catching concave part 67 and the wall 71 of the cap is engaged (See FIG. 14), and the gasket of the cap 68 and the bead part 65*a* is tightly contacted to form sealing. Resultantly, it prevents the contents to get into the cylindrical space 73 formed between the can 61 and the inner cylinder 71 of the cap. Thereby, the inside surface of the neck part 65 of the can 61 whose coating films are damaged in the high-degree deformation processing to form the can body 61 is protected. Further, since it is the double-sealing structure, the amount of contents that may get in the space 73 by any chance is small, and it never gets out the metal container.

EMBODIMENTS

The effects of the invention are described below referencing examples.

Example 1

As a material for the first layer having high durability to deformation processing, phenolic epoxy resin type coating compound whose epoxy/phenol ratio (herein after referred to E/P ratio) is 80/20, and for the second layer having high corrosion-resistivity, phenolic epoxy resin type coating compound whose E/P ratio is 70/30 were prepared. The material for the first layer whose thickness was adjusted to be 3 to 5 μm was coated over the entire inner surface of the half-processed product (thickness of the body to be 0.45 mm, and thickness of the bottom to be 1.1 mm) of a bottomed cylindrical threaded impact can whose outer diameter is 53 mm. The material for the second layer whose thickness was adjusted to be 4 to 6 μm was coated by wet on wet process over the entire inner surface of the intermediate including the first layer. The first and the second layer were hardened by the baking process. Further, the shoulder 16 and the neck part 17 were formed by the necking processing, and then the bead part 18 and the thread part 17*a* was formed to manufacture the metal container of the example 1.

Example 2

As the coating compound of the second layer, the same material as used in the example 1 was used excepting that phenolic epoxy resin whose E/P ratio is 70/30 was used, in which titanium oxide whose weight is 53 wt % of the resin was mixed as a pigment.

Example 3

As the coating compound of the second layer, the same material as used in the example 1 was used excepting that phenolic epoxy urea resin coating compound whose E/P/U (urea) ratio is 60/24/16 was used to manufacture the metal container of the example 3.

Example 4

As the coating compound of the second layer, the same material as used in the example 1 was used excepting that phenolic epoxy resin whose E/P/I ratio is 78/22 was used to manufacture the metal container of the example 4.

Comparative 1

The same procedure as the example 1 was carried out to manufacture the metal container of the comparative 1 excepting that as for the coating film the coating compound of the first layer was only laid on the entire inner surface of the half-processed product.

Comparative 2 to 5

The same procedure as the example 1 was carried out to manufacture the metal container of the comparative 2 to 5 excepting that as for the coating film the coating compound of the second layer of the example 1 to 4 was only laid on the entire inner surface of the half-processed product.

To examine the degree of damage of the coating film due to the post-processing, 5% salt solution was fully poured into the above obtained metal containers, and then, the electric current (average value of N=10) between the inner surface and the outer surface were measured 4 second after the application of DC 6.3V. Further, the corrosion-resistivity of inside coating films of the can body was examined by following test conditions. The results are shown below in table 1.

Test Conditions

One conditioner for permanent wave (thioglycolic acid series or cysteine series) was charged by half, and laid horizontally for two weeks at 55° C. Blistering in the gas-liquid boundary face, delicate corrosion and the discoloration due to reactant generation of aluminum base were visually observed

TABLE 1

| | | | | | Corrosion-Resistivity (One conditioner for permanent wave is charged.) | | | |
|---|---|---|---|---|---|---|---|---|
| | | | | Electric Current | Thioglycolic acid series | | Cysteine series | |
| | First Layer | Second Layer | Pigment | Value (mA) | Thread part | Can body | Thread part | Can body |
| Example 1 | 80/20 | 70/30 | — | 4 | ○ | ◎ | ◎ | ◎ |
| Example 2 | 80/20 | 70/30 | Contained | 47 | Δ | ◎ | ○ | ◎ |

TABLE 1-continued

| | First Layer | Second Layer | Pigment | Electric Current Value (mA) | Corrosion-Resistivity (One conditioner for permanent wave is charged.) | | | |
|---|---|---|---|---|---|---|---|---|
| | | | | | Thioglycolic acid series | | Cysteine series | |
| | | | | | Thread part | Can body | Thread part | Can body |
| Example 3 | 80/20 | 60/24/16 (U) | — | 0.5 | ○ | Δ | ○ | ○ |
| Example 4 | 80/20 | 78/22 | — | 2 | ○ | ◉ | ◉ | ◉ |
| Comparative 1 | 80/20 | — | — | 0.1 | Δ | X | ○ | Δ |
| Comparative 2 | — | 70/30 | — | 200 UP | X | ◉ | X | ◉ |
| Comparative 3 | — | 70/30 | Contained | 200 UP | X | ◉ | X | ◉ |
| Comparative 4 | — | 60/24/16 (U) | — | 5 | Δ | Δ | ○ | ○ |
| Comparative 5 | — | 78/22 | — | 60 | Δ | ○ | Δ | ◉ |

*(U) is urea resin.
Criteria
◉ Normal
○ Extremely minor abnormal observed but practically be of no problem.
Δ Minor abnormal observed.
X Abnormal observed. Practically be of a problem.

As shown in above, the example 1 to 4 have a tendency that the fewer the phenol component is in the second layer, the better the current value becomes (the current was low). And that the more the phenol component is the better the corrosion-resistivity becomes. In any of the example 1 to 4, the existence of the first layer makes the current value of the second layer better resultantly preventing the occurrence of cracks and peelings. The corrosion-resistivity was sufficiently high. In the example 2 containing pigment in the second layer, the corrosion-resistivity was particularly improved and also it had good current value.

On the other hand, in the comparative 1 having only the first layer, the current value was good but the corrosion-resistivity was inferior to the examples. In the comparative 2 to 5 having only the second layer, the corrosion-resistivity is about the same as that of the example 1 to 3, but the current value was extremely high as to be more than 60 mA, except for the one in which phenolic epoxy urea resin was laminated. This is supposed to be due to the occurrence of cracks or peelings of the coating films in the processing. In the comparative 4 in which phenolic epoxy urea resin was laminated, compared to the example 3, a little difference was found in with or without the first layer, but corrosion-resistivity to tioglicolin acid series was inferior to that of the example 3.

Example 5

The metal container 50a shown in FIG. 11a was used for the example 5. As the material for the first layer made of UV ink, free-radical polymerization type acrylic modified epoxy resin was prepared. As the material for second layer having high corrosion-resistivity, phenolic epoxy resin type coating compound having E/P ratio of 70/30 was prepared. The material of the first layer was coated with the thickness of 30 to 670 μm over the entire inner surface of the half-processed can which is a bottomed cylindrical threaded impact can whose outer diameter was 53 mm (thickness of the can body was 0.45 mm and that of the bottom is 1.1 mm). The first layer was illuminated by ultra violet rays whose wavelength was 370 nm for 10 seconds to harden the first layer. And then, the material of the second layer was coated with the thickness of 8 to 12 μm and hardened at 230 degree celcius by baking process for 7 minutes. The shoulder and the neck part were formed by necking processing, and, the bead part and the thread part were formed to manufacture the container, after the forming of the coating film.

Comparative 6

As an example, the same metal container as the example 5 in which coating film having only one layer made of UV ink was employed as the comparative 6. The same UV ink as the example 5 was prepared and coated with the thickness of 30 to 70 μm, and then the film was hardened by illumination of ultra violet rays whose wavelength was 370 nm for 10 seconds. Same as the example 5, the shoulder, the neck part, and the thread part were formed to manufacture the container, after the forming of the coating film.

Comparative 7

As an example, the same metal container as the example 5 in which the coating film made of phenolic epoxy type resin coating compound having E/P ratio of 70/30 was employed as the comparative 7. This was coated with the thickness of 8 to 12 μm and hardened by baking process at 230° C. for 7 minutes. Same as the example 5, the shoulder, the neck part, and the thread part were formed to manufacture the container.

The above obtained containers of the electric current value of the example 5, comparative 6 and 7 were measured by the above mentioned methods. The results are shown below in table 2.

TABLE 2

| | Electric Current Value |
|---|---|
| Example 5 | 0.01 to 0.17 mA |
| Comparative 6 | 3.9 mA |
| Comparative 7 | 3.5 mA |

As described above, the electric current value in the comparative 6 and 7 was relatively good, but the electric current value of the metal container used in the example 5 was found to be much improved compared with these comparatives. That is to say, this invention greatly prevented the occurrence of pinholes of the inside coating film.

What is claimed is:

1. An inside-coated metal container, comprising:
   a cylindrically-shaped metal container body 11 including a cylindrical body member 14 having a top end and a bottom end, a bottom member 15 connected to the bottom end, a shoulder member 16 having a truncated cone shape connected to the top end, a cylindrical neck member 17 connected to a top of the shoulder member, a curling part 18 winding outward connected to a top of the neck member, and a thread part 17a formed around the neck part, the cylindrically-shaped metal container body is a mono-block container processed by an impact processing, a drawing, or a drawing-ironing; and
   a coating film including a first layer 12 composed of an phenolic epoxy resin type coating compound having high durability to deformation processing applied to an inner surface of an upper part of cylindrical body member, an inner surface of the shoulder member, and an inner surface of the neck member; and a second layer composed of an phenolic epoxy resin type coating compound having high corrosion resistance applied entirely to an inner surface of the cylindrically-shaped metal container body including the first layer,
   wherein the first layer is composed of an phenolic epoxy resin type coating compound containing 10 to 30 wt % of a phenol component and the second layer is composed of an phenolic epoxy resin type coating compound containing 20 to 50 wt % of a phenol component; and the amount of the phenol component contained in the first layer is 1 to 10 wt % less than that contained in the second layer.

2. An inside-coated metal container according to claim 1, wherein the coating film further includes a third layer 39 composed of an phenolic epoxy resin type coating compound having high durability to deformation processing of the first layer is applied to an area of the first layer on the second layer.

3. An inside-coated metal container, comprising:
   a cylindrically-shaped metal container body 11 including a cylindrical body member 14 having a top end and a bottom end, a bottom member 15 connected to the bottom end, a shoulder member 16 having a truncated cone shape connected to the top end, a cylindrical neck member 17 connected to a top of the shoulder member, a curling part 18 winding outward connected to a top of the neck member, and a thread part 17a formed around the neck part, the cylindrically-shaped metal container body is a mono-block container processed by an impact processing, a drawing, or a drawing-ironing; and
   a coating film including a first layer 12 composed of an phenolic epoxy resin type coating compound having high durability to deformation processing applied to an inner surface of an upper part of cylindrical body member, an inner surface of the shoulder member, and an inner surface of the neck member; and a second layer composed of an phenolic epoxy resin type coating compound having high corrosion resistance applied to a rest of an inner surface of the cylindrically-shaped metal container body, wherein a bottom of the first layer and a top of the second layer are overlapped,
   wherein the first layer is composed of an phenolic epoxy resin type coating compound containing 10 to 30 wt % of a phenol component and the second layer is composed of an phenolic epoxy resin type coating compound containing 20 to 50 wt % of a phenol component; and the amount of the phenol component contained in the first layer is 1 to 10 wt % less than that contained in the second layer.

4. An inside-coated metal container according to claim 1 or 3, wherein a reduced diameter cylindrical part is formed between the shoulder member and the neck member.

5. An inside-coated metal container according to claim 1 or 3, wherein a third layer composed of Ultra Violet ink is applied to a whole or apart of an inner surface of the a cylindrically-shaped metal container body.

6. An inside-coated metal container according to claim 1 or 3, wherein a third layer composed of hot-melt agent is applied to a whole or a part of an inner surface of the a cylindrically-shaped metal container body.

7. An inside-coated metal container according to claim 1 or 3, wherein the second layer is composed of an phenolic epoxy resin type coating compound containing a pigment and the first layer is composed of an phenolic epoxy resin type coating compound containing no or smaller amount of the pigment than the amount of pigment contained in the second layer.

8. An inside-coated metal container according to claim 1 or 3, wherein the first layer is composed of an phenolic epoxy resin type coating compound using a high-molecular weight epoxy resin and the second layer is composed of an phenolic epoxy resin type coating compound using a low-molecular weight epoxy resin.

9. An inside-coated metal container according to claim 1 or 3, wherein the first layer is composed of a water-based epoxy acrylate resin type coating compound using a high-molecular weight epoxy resin and the second layer is composed of an phenolic epoxy resin type coating compound using a low-molecular weight epoxy resin.

* * * * *